(12) United States Patent
Hermanson

(10) Patent No.: US 11,953,225 B2
(45) Date of Patent: Apr. 9, 2024

(54) SEALED AND/OR REINFORCED FLANGED RING CONNECTOR FOR SINGLE- AND DOUBLE-WALL HVAC DUCTING

(71) Applicant: Jeffrey Allen Hermanson, Algona, WA (US)

(72) Inventor: Jeffrey Allen Hermanson, Algona, WA (US)

( * ) Notice: Subject to any disclaimer, the term of this patent is extended or adjusted under 35 U.S.C. 154(b) by 564 days.

(21) Appl. No.: 16/746,056

(22) Filed: Jan. 17, 2020

(65) Prior Publication Data

US 2020/0149775 A1 May 14, 2020

Related U.S. Application Data

(60) Division of application No. 14/668,878, filed on Mar. 25, 2015, now Pat. No. 10,539,337, which is a continuation-in-part of application No. 12/953,040, filed on Nov. 23, 2010, now Pat. No. 8,039,153.

(60) Provisional application No. 62/111,040, filed on Feb. 2, 2015, provisional application No. 61/264,201, filed on Nov. 24, 2009.

(51) Int. Cl.
| | |
|---|---|
| F24F 13/02 | (2006.01) |
| B21B 1/22 | (2006.01) |
| B21D 22/16 | (2006.01) |
| B21D 53/16 | (2006.01) |
| F16L 9/16 | (2006.01) |
| F16L 23/12 | (2006.01) |
| F16L 23/14 | (2006.01) |

(52) U.S. Cl.
CPC ............ *F24F 13/0209* (2013.01); *B21B 1/22* (2013.01); *B21D 22/16* (2013.01); *B21D 53/16* (2013.01); *F16L 9/165* (2013.01); *F16L 23/12* (2013.01); *F16L 23/14* (2013.01); *F24F 13/0245* (2013.01)

(58) Field of Classification Search
CPC ..... F24F 13/0209; F24F 13/0245; B21B 1/22; B21D 22/16; B21D 53/16; F16L 9/165; F16L 23/12; F16L 23/14
See application file for complete search history.

(56) References Cited

U.S. PATENT DOCUMENTS

| | | |
|---|---|---|
| 233,145 A | 10/1880 | Demarest |
| 565,499 A | 8/1896 | Pattison |

(Continued)

FOREIGN PATENT DOCUMENTS

| | | |
|---|---|---|
| CA | 2117216 A1 | 9/1994 |
| DE | 29 16 801 A1 | 11/1980 |

(Continued)

OTHER PUBLICATIONS

"HVAC Duct Construction Standards: Metal and Flexible," 2d ed., Sheet Metal and Air Conditioning Contractors' National Association, Inc. [SMACNA], Chantilly, Va., 1995, "Table 1-12 Transverse Joint Reinforcement," p. 1.36.

(Continued)

*Primary Examiner* — James M Hewitt, II

(57) ABSTRACT

A flanged ring connector (50) for connecting adjacent ends of HVAC ducting (52) includes an insertion flange portion to engage within the interior of the ducting. A mating flange portion (56) extends laterally or transversely to the insertion flange portion (54). A seat (58) is formed along the mating flange portion (56) to receive and retain a seal (60) and/or a reinforcing member or bead (90).

14 Claims, 36 Drawing Sheets

(56) References Cited

U.S. PATENT DOCUMENTS

| | | |
|---|---|---|
| 704,936 A | 7/1902 | Scherer |
| 872,442 A | 12/1907 | Morris |
| 1,863,122 A | 6/1932 | Matthews |
| 1,969,499 A | 8/1934 | Bradshaw |
| 1,975,925 A | 10/1934 | Compo |
| 2,123,410 A | 7/1938 | Fawcett |
| 2,227,551 A | 1/1941 | Morris |
| 2,245,037 A | 6/1941 | Hersey, Jr. |
| 2,271,425 A | 1/1942 | Harris |
| 2,338,191 A | 1/1944 | Lumm |
| 2,473,102 A | 6/1949 | Krooss |
| 2,474,887 A | 7/1949 | Carswell |
| 2,489,587 A | 11/1949 | Rice |
| 2,519,847 A | 8/1950 | Neely |
| 2,541,205 A | 2/1951 | Christophersen |
| 2,548,249 A | 4/1951 | Woolsey |
| 2,599,882 A | 6/1952 | Adams |
| 2,674,471 A | 4/1954 | Hawkins |
| 2,826,804 A | 3/1958 | Wickwire |
| 2,883,211 A | 4/1959 | Grass |
| 2,916,076 A | 12/1959 | Young |
| 3,001,805 A | 9/1961 | Jones |
| 3,266,285 A | 8/1966 | Jensen |
| 3,329,446 A | 7/1967 | Katis |
| 3,347,569 A | 10/1967 | Lindgren |
| 3,710,609 A | 1/1973 | Jones |
| 3,712,649 A | 1/1973 | Martin |
| 3,749,425 A | 7/1973 | Howland |
| 3,815,638 A | 6/1974 | Martin |
| 3,871,688 A | 3/1975 | Molino |
| 3,996,783 A | 12/1976 | Meserole |
| 4,023,250 A | 5/1977 | Sproul |
| 4,041,746 A | 8/1977 | Kraft |
| 4,046,409 A | 9/1977 | Virgin |
| 4,117,704 A | 10/1978 | Nakache |
| 4,144,732 A | 3/1979 | Franks |
| 4,170,888 A | 10/1979 | Golata |
| 4,215,518 A | 8/1980 | Blair |
| 4,218,079 A | 8/1980 | Arnoldt |
| 4,304,423 A | 12/1981 | Mez |
| 4,361,021 A | 11/1982 | McVay |
| 4,418,948 A | 12/1983 | Lew |
| 4,516,797 A | 5/1985 | Meinig |
| 4,524,595 A | 6/1985 | Oda |
| 4,571,980 A | 2/1986 | Goodwin |
| 4,653,725 A | 3/1987 | Nanz |
| 4,739,802 A | 4/1988 | Meinig |
| 4,765,167 A | 8/1988 | Sampson |
| 4,803,881 A | 2/1989 | Dudley |
| 4,862,724 A | 9/1989 | Haws |
| 4,914,939 A | 4/1990 | Brinegar |
| 4,940,264 A | 7/1990 | Mez |
| 4,974,440 A | 12/1990 | Brinegar |
| 5,022,668 A | 6/1991 | Kenny |
| 5,022,688 A | 6/1991 | Arnoldt |
| 5,129,690 A | 7/1992 | Meinig |
| 5,133,580 A | 7/1992 | Meinig |
| 5,195,789 A | 3/1993 | Walsh |
| 5,352,000 A | 10/1994 | Issagholian-Havai |
| 5,393,106 A | 2/1995 | Schroeder |
| 5,456,099 A | 10/1995 | Lipari |
| 5,762,109 A | 6/1998 | Matthews |
| 5,809,649 A | 9/1998 | Köstermeier |
| 5,983,496 A | 11/1999 | Hermanson |
| 6,000,260 A | 12/1999 | Price |
| 6,260,403 B1 | 7/2001 | Johnston |
| 6,289,706 B1 | 9/2001 | Hermanson |
| 6,301,781 B1 | 10/2001 | Hermanson |
| 6,540,266 B2 | 4/2003 | Pakker |
| 6,550,823 B1* | 4/2003 | Siegwart ............... F16L 23/04 285/344 |
| 6,644,083 B2 | 11/2003 | Pakker |
| 6,935,152 B2 | 8/2005 | Dole |
| 7,082,796 B1 | 8/2006 | Hermanson |
| 7,163,030 B2 | 1/2007 | Hermanson |
| 7,216,898 B1 | 5/2007 | Hermanson |
| 7,743,504 B1 | 6/2010 | Hermanson |
| 10,539,337 B2* | 1/2020 | Hermanson ............ B21D 53/16 |
| 2001/0054822 A1 | 12/2001 | Pakker |
| 2002/0094233 A1 | 7/2002 | Price |
| 2002/0140231 A1* | 10/2002 | Poole ................... F24F 13/0209 285/368 |
| 2004/0262922 A1 | 12/2004 | Andersson |
| 2005/0116470 A1 | 6/2005 | Duffy |
| 2008/0134745 A1 | 6/2008 | Hermanson |
| 2009/0085347 A1 | 4/2009 | Sandman et al. |
| 2011/0121569 A1 | 5/2011 | Hermanson |

FOREIGN PATENT DOCUMENTS

| | | |
|---|---|---|
| DE | 43 08 013 A1 | 9/1994 |
| EP | 0 443 193 A2 | 8/1991 |
| EP | 0 458 062 A3 | 11/1991 |
| EP | 0 537 594 A2 | 4/1993 |
| EP | 0 687 845 A1 | 12/1995 |
| GB | 871 733 A | 6/1961 |
| GB | 1 242 990 A | 8/1971 |
| GB | 1 425 778 A | 2/1976 |
| GB | 1 581 386 A | 12/1980 |
| JP | 60-238528 A | 11/1985 |
| JP | 61-007028 A | 1/1986 |
| WO | 2008/073837 A2 | 6/2008 |
| WO | 2013/086191 A1 | 6/2013 |

OTHER PUBLICATIONS

International Search Report and Written Opinion dated May 9, 2011, issued in corresponding International Application No. PCT/US2010/057830, filed Nov. 23, 2010, 13 pages.
Invitation to Pay Additional Fees and Partial International Search Report dated Mar. 11, 2011, issued in corresponding International Application No. PCT/US2010/057830, filed Nov. 23, 2010, 4 pages.
Johnson, H.V., "Metal Spinning Designs," Bruce Publishing, Milwaukee, Wisc., 1941, Chap. II, "Tools and Materials," pp. 12-13, 15-16; Chap. III, "Fundamentals of Metal Spinning," pp. 21-27.
Reagan, J.E., and E.E. Smith, "Metal Spinning for Craftsmen, Instructors, and Students," Bruce Publishing, Milwaukee, Wisc., 1936, Chap. IV, "Spinning Tools," pp. 23-28; Chap. V, "Chucks for Metal Spinning," pp. 29-32, 34-36.
Stieri, E., "Sheet Metal Principles and Procedures," Prentice-Hall, New York, 1953, Chap. 9, "Metal Spinning," pp. 176-185.
Walker, J.R., "Modern Metalworking," Goodheart-Willcox, South Holland, Ill., 1985, Unit 11, "Sheet Metal," pp. 141-158; Unit 27, "Metal Spinning," pp. 425-436.
Canadian Office Action dated Oct. 19, 2016, issued in corresponding Canadian Application No. 2,781,617, filed Nov. 23, 2010, 4 pages.

\* cited by examiner

[SPIN/ROLL/STAMP FLAT RING; SPIN CHANNEL HEM]

*[STAMP CHANNEL AND FACE IN STRAIGHT; ROLL INTO ROUND RING]*

[SPIN INTO BAND; SPIN INTO FLAT FACE; STAMP CHANNEL]

[ROLL FORM CHANNEL AND
FLAT FACE; ROLL INTO RING]

[ROLL FORM CHANNEL IN FLAT;
ROLL FORM FLAT FACE; BEND
INTO SQUARE/RECTANGULAR
CROSS-SECTION]

[STAMP FROM ANNULAR, FLAT WORK PIECE]

SEALED AND/OR REINFORCED FLANGED RING CONNECTOR FOR SINGLE- AND DOUBLE-WALL HVAC DUCTING

CROSS-REFERENCES TO RELATED APPLICATIONS

This application is a division of U.S. patent application Ser. No. 14/668,878, filed Mar. 25, 2015 (now U.S. patent Ser. No. 10/539,337), which claims the benefit of U.S. Provisional Application No. 62/111,040, filed Feb. 2, 2015, and which is also a continuation-in-part of U.S. patent application Ser. No. 12/953,050, filed Nov. 23, 2010 (now U.S. Pat. No. 9,061,342), which claims the benefit of U.S. Provisional Application No. 61/264,201, filed Nov. 24, 2009, the disclosures of all of which are incorporated herein by reference in their entireties.

FIELD OF THE INVENTION

The present invention relates to flanged ring connectors for connecting single- or double-wall HVAC ducting of various cross-sectional shapes, such as round, oval, square, rectangular, etc., wherein the flanged ring connector includes a "built-in" seal for sealing against a mating flanged ring connector connected to the end of an adjacent HVAC duct. In addition, or in alternative to the seal, the flanged ring connector may be configured to receive a reinforcing bead or similar member to increase the section modulus of the flanged ring connector.

BACKGROUND OF THE INVENTION

Various types of joint assemblies are utilized to interconnect HVAC ducting of circular, oval, square, rectangular, or other cross-sectional shapes. One type of joint assembly is in the form of a flanged ring, which is connected to the end of a duct section to present a mating flange extending transversely to the length of the duct and extending radially or laterally from the exterior of the duct. The two mating flanges of the adjacent flanged rings may be attached together in face-to-face relationship by screws, bolts, or other hardware members extending through the mating flanges, as well as connector rings or clips that entirely or partially encircle the exterior of the mating flanges of the adjacent flanged rings.

It is often necessary to place a gasket between the two mating flanges of the adjacent flanged rings to control or avoid leakage of air or other gases being transmitted through the ducting. Ensuring that the gasket is properly assembled with the flanged rings has been challenging. It is possible to glue a gasket to one or both of the mating flanged rings. However, additional labor is required to glue the gasket to the mating flange. In addition, during transport or assembly the gasket material may become damaged or become detached from the mating flange.

Also, in large-diameter HVAC ducting, the flanged rings are often not sufficiently stiff to create a satisfactory joint between the HVAC duct sections. The flanged rings can be manufactured from thicker gauge material, but doing so increases the cost of the flanged rings, and increases the weight of the flanged rings, as well as increasing the difficulty in forming the flanged rings into desired shapes. As such, efforts have been made to produce flanged rings with exterior hems and returns to increase the section modulus of the flanged rings. However, other alternatives for reinforcing or increasing the strength and rigidity of flanged rings are desirable.

SUMMARY

A flanged ring connector to join HVAC ducting includes a first mating flange defining a first mating face, the first mating flange having an outer perimeter portion and an inner perimeter portion. A first insertion flange extends laterally from the inner perimeter portion of the first mating flange. The first insertion flange is of sufficient length to allow fixed attachment to the HVAC duct. A first formed seat extends along the first mating flange. The seat is sized and shaped to receive either a seal disposed within the first seat to project from the first seat beyond the first mating face, and/or a reinforcing member disposed within the first seat to increase the structural integrity of the flanged ring connector.

The flanged ring may include a second seat formed in the insertion flange to receive a second seal for bearing against the HVAC duct. The second seat may be at least partially open to enable the second seal to project from the insertion flange toward the HVAC duct.

In accordance with the present disclosure, the first and/or second seat can be selected from various cross-sectional shapes, for example, square, polygonal, oblong, rectangular, circular, partially circular, quarter-circular, semicircular, elliptical, oval, triangular, frusto-triangular, and V-shaped.

The flanged ring connector may include a second mating flange defining a second mating face. The second mating flange defines an outer perimeter portion and an inner perimeter portion. A second insertion flange extends laterally from the inner perimeter portion of the second mating flange a sufficient distance to allow attachment of the second insertion flange to a duct of a double-wall HVAC duct.

A second mating flange is disposed within the inner perimeter portion of the first mating flange. In addition, the first and second mating flange faces are substantially coplanar to each other.

In accordance with a further aspect of the present disclosure, the first seat may extend along the outer perimeter portion of the first mating flange. Alternatively, the first seat may extend along the first mating flange at a location intermediate the outer perimeter portion and the inner perimeter portion of the first mating flange.

In a further aspect of the present disclosure, a flanged ring connector is provided to join double-wall ducts of HVAC systems. The double-wall ducts have an outer duct and a separate inner duct disposed within the outer duct. The flanged ring connector includes a mating flange defining a mating face, the mating flange having an outer perimeter portion and an inner perimeter portion. A first inner insertion flange extends laterally from the inner perimeter of the mating flange for sufficient distance to allow attachment to the inner duct of the double-wall duct. A second, outer insertion flange extends laterally from the mating flange at the location between the inner and outer perimeters of the mating flange. The outer insertion flange has a sufficient length for attachment to the outer duct of the double-wall duct. A first formed seat extends along the mating flange, with the seat sized and shaped to receive one or both of a first seal to project from the first seat outwardly of the mating face and a reinforcing member to increase the section modulus of the flanged ring connector.

In accordance with a further aspect of the present disclosure, the first formed seat may be at different positions relative to the mating flange. For example, the first formed seat may extend along the outer perimeter of the mating flange. Alternatively, the first formed seat may extend along the mating flange at a location intermediate the outer perimeter portion and inner perimeter portion of the mating flange.

Various methods may be utilized to form a flanged ring connector for inner connecting ducts in an HVAC system. The flanged ring connector includes a mating flange with an outside perimeter portion and an inside perimeter portion. At least one insertion flange extends laterally from the mating flange for connection to the HVAC ducting. A seat extends along the mating flange to receive one or both a seal and a reinforcing member. A method of forming the flanged ring connector begins with a cylindrical metal band having an outward surface and an inward surface. The metal band is deformed by applying pressure against the interior surface of the metal band at a location intermediate the ends of the metal band, thereby to deform the metal band to form a mating flange portion extending laterally outwardly from the metal band. The undeformed portion of the metal band functions as an insertion flange. The mating flange portion is further deformed to define a seat located along the mating flange. The seat is shaped to receive a seal to project from the seat in a direction opposite to the direction that the insertion flange extends from the mating flange, and/or a reinforcing member to increase the section modulus of the flanged ring connector. One or more of the foregoing deforming steps may be carried out by spin-forming, roll-forming, bending, stamping, and/or punching the workpiece.

As a further aspect of the present invention, the flanged ring connector can be formed beginning with a workpiece in the form of a strip. The mating flange and seat are formed in and along the longitudinal strip. Thereafter, the partially formed workpiece is formed into a closed ring configuration to match the cross-sectional shape of the HVAC ducting. The formed ring configuration includes a mating flange, at least one insertion flange extending laterally from the mating flange, and a seat extending along the mating flange. One or more of the forming steps can be carried out by spin-forming, roll-forming, bending, stamping, and/or punching. The closed ring is shaped to match the shape of the HVAC ducting, and therefore can be round, oval, ovoid, square, rectangular, rectilinear, or triangular.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
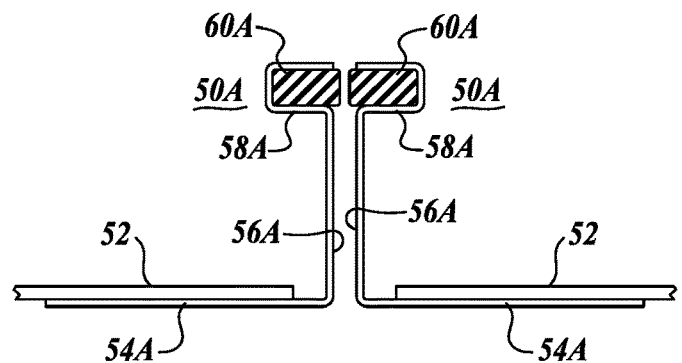
FIGS. 1 and 3-10 illustrate, in partial cross-section, various configurations of flanged ring connectors corresponding to the present disclosure, shown in face-to-face relationship to each other, with seal members of various exemplary shapes.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application includes references to directions, such as "forward," "rearward," "upward," "downward," "outward," "inward," "extended," "advanced," and "retracted." These references and other similar references in the present application are only to assist in helping describe and understand the present invention and are not intended to limit the present invention to these directions. Also, references to "work product," "workpiece," "food product," "food piece," and "portion" are understood to be interchangeable and are not meant to be limiting in nature.

In the following description, various embodiments of the present disclosure are described. In the following description and in the accompanying drawings, the corresponding systems assemblies, apparatus, and units are identified by the same part number but with an alpha suffix with a prime ('), double prime ("), or triple prime ('''), or similar designation. The descriptions of the parts/components of such connectors, systems, assemblies, apparatus, and units that are the same or similar are not repeated so as to avoid redundancy in the present application.

FIGS. 1-19 pertain to various embodiments of flanged connector rings 50 for connecting adjacent ends of HVAC ducting 52. The flanged ring connectors 50 are similar in that they include an insertion flange portion 54 to engage within the interior of the duct 52 and are of a shape corresponding to the cross-sectional shape of the duct 52. The flanged ring connectors 50 also include a mating flange portion 56 extending laterally or transversely to the insertion flange portion 54. A seat 58 is formed along the mating flange portion 56 to receive and retain a seal 60. The seat 58 is shown as extending along the outer perimeter portion of the mating flange portion 56, but need not be at such location. For example, the seat can be located inward of the outer perimeter of the mating flange portion.

The flanged ring connectors 50, shown in FIGS. 1-19, are labeled as flanged rings 50A-50R. Also, the corresponding components or sections of the flanged rings of FIGS. 1-19 are identified by the same part number, but with an alpha suffix, from A through R.

As shown in FIGS. 1-19, the seat 58 can be of various configurations corresponding to the shape of seal 60. For example, in FIG. 1, the seat 58A is rectangular in cross-sectional shape to receive rectangularly shaped seal member 60A therein. The seal members 60A extend forwardly from the forward faces of the mating flanges 56A to press against the corresponding seal 60A of the opposite flanged ring connector 50A. The seal member 60A, as well as the other similar seals disclosed and discussed herein, can be of various material compositions. For example, the seal may be composed of natural or synthetic rubber material that may be of solid construction or of foam construction, or of hollow or semi-hollow construction. The seal will need to be at least somewhat compressible so that the mating flanges can be connected together in secure face-to-face relationship to each other, with the compressed seal forming an airtight juncture between the mating flanges.

Figure 2:
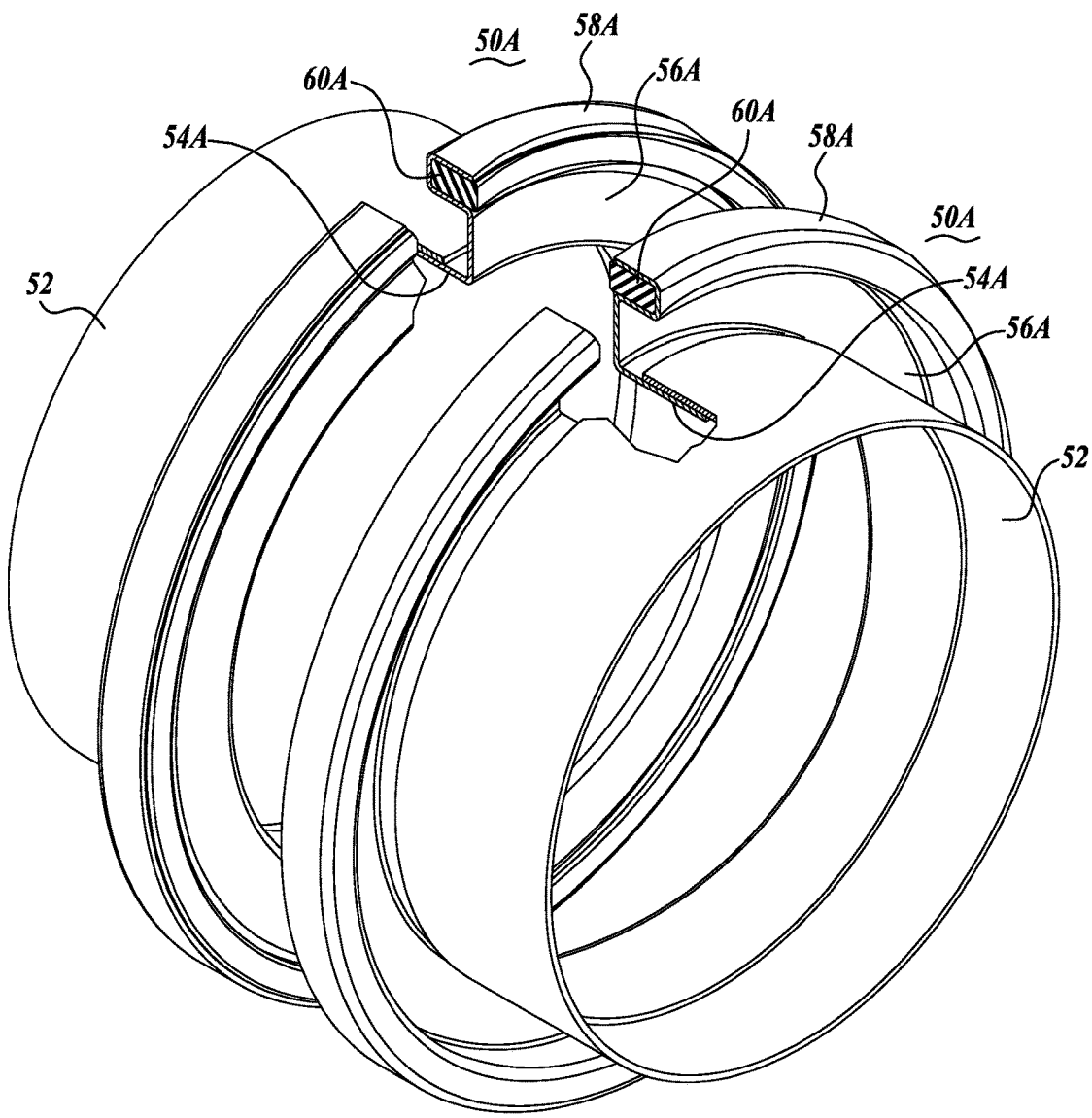
FIG. 2 is an isometric view of the flanged ring connector of FIG. 1, shown in conjunction with HVAC ducts.

FIG. 2 is an isometric view showing the flange connector 50A assembled with the adjacent end portions of duct sections 52. The duct 52 is illustrated as being of single-wall, circular construction. However, the duct can be of other cross-sectional shapes, including square, rectangular, oval, triangular, etc. Further, as discussed below, the ducting can be of double-wall or even triple-wall construction in accordance with the present disclosure. The mating flanges 56A can be attached together by various techniques, including by screws, bolts, or other types of hardware. Also, clips can extend over and at least partially around the seats 58A of adjacent connectors 50A to lock the mating flanges in face-to-face relationship to each other. Alternatively, a band clamp may be used to extend around a perimeter of the seat portions of the flanged connectors, thereby to hold the mating flanges 56A in face-to-face contact with each other.

Figure 3:
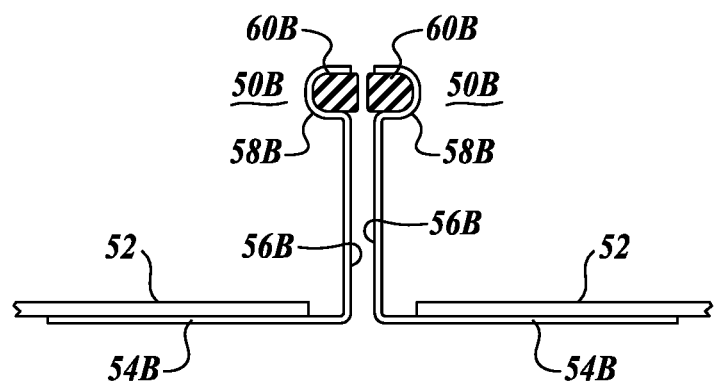

Regarding flanged connector ring 50B, shown in FIG. 3, a seal 60B is shaped to have a semicircular or rounded base and a "square" face extending beyond flanged ring face 56B. The seat 58B is formed to correspond to the shape of the seal 60B.

Figure 4:
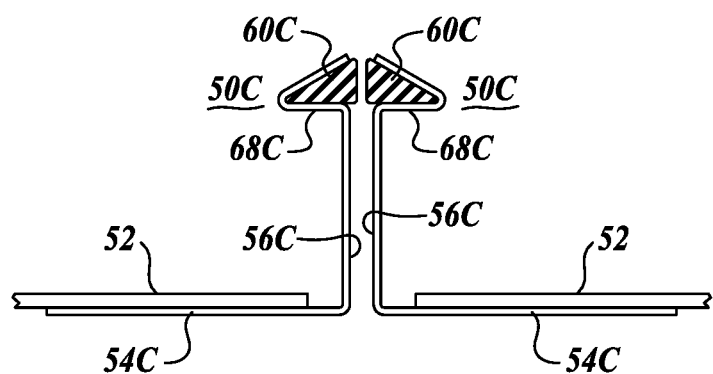

The flanged ring 50C, shown in FIG. 4, includes a generally right triangularly shaped seal 60C, with the base of the seal projecting forwardly of the forward face of the mating flange portion 56C. The tip of the seal 60C is positioned at the bottom or base of the triangularly shaped seat 58C.

Figure 5:
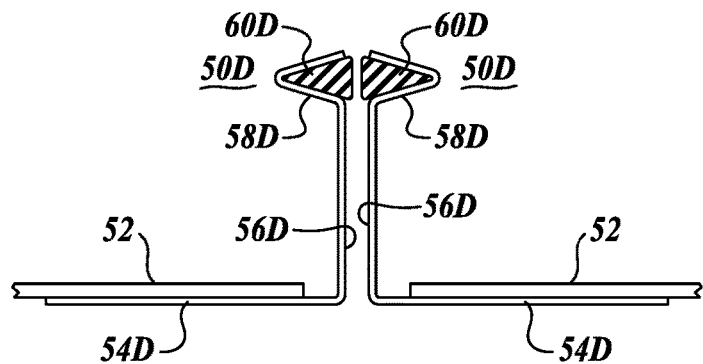

Referring to the flanged ring connector 50D of FIG. 5, the seal 60D is also of triangular shape, but with the triangle being of symmetrical cross-section as opposed to a right angle cross-section as shown in FIG. 4. The seat 58D is shaped to correspond to the shape of the seal 60D.

Figure 6:
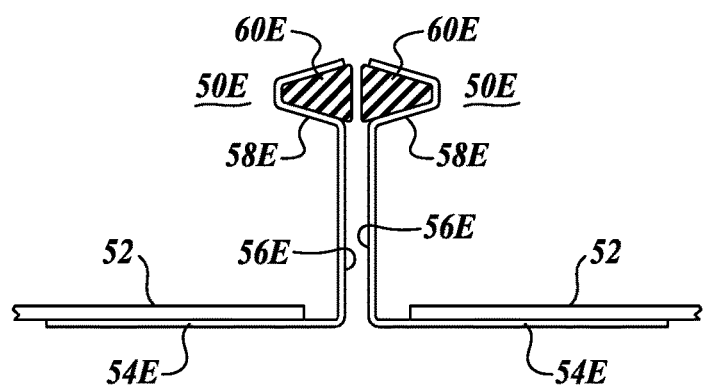

Referring to the flanged ring connector 50E shown in FIG. 6, the seal 60E is in the form of a truncated triangle, again with the base of the triangle projecting forwardly of the mating flange portion 56E. The seat 58E corresponds to the shape of a seal 60E.

Figure 7:
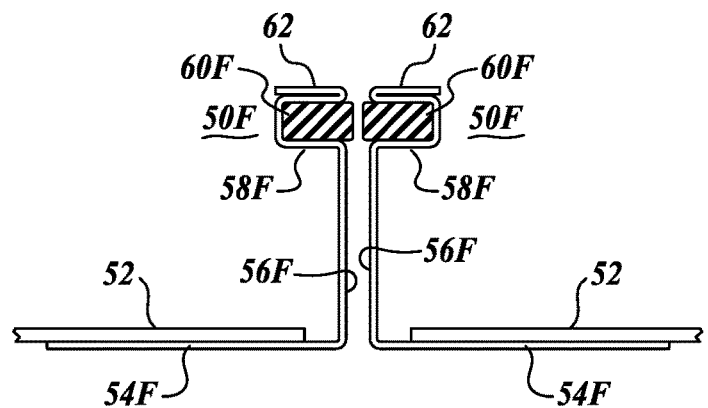

Referring to FIG. 7, the seal 60F shown therein is similar to the seal 60A shown in FIGS. 1 and 2; however, the seat 58F is constructed with a hem section 62 at the exterior of the seat 58F, thereby to provide additional structural integrity for the flanged connector 60F. The use of a hem, for example, similar to hem 62, is not limited to the embodiment of the present disclosure shown in FIG. 7, but may be utilized in other embodiments of the present disclosure described in this application.

Figure 8:
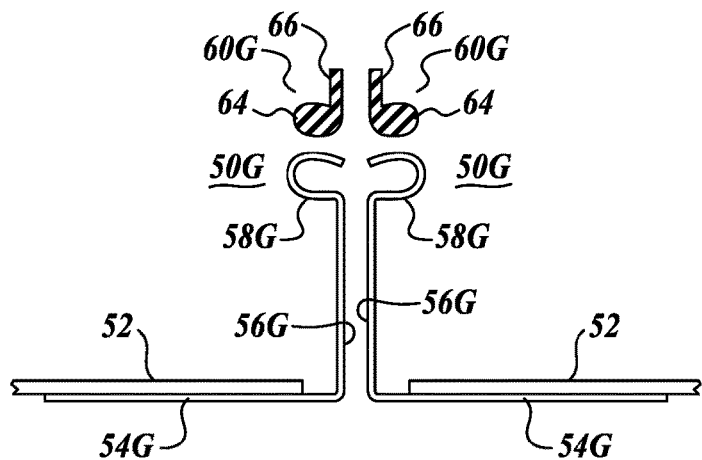

Referring to FIG. 8, the seal 60G includes a generally ovoid-shaped base section 64 and a leg section 66 extending outwardly from the base section. The base section 64 is retained within seat 58G so that the leg section 66 can project forwardly of the forward face of the mating flange portion 56G. It is to be understood that the leg section 66 can extend inwardly rather than outwardly, as shown in FIG. 8. Also, the leg section can extend both inwardly and outwardly.

Figure 9:
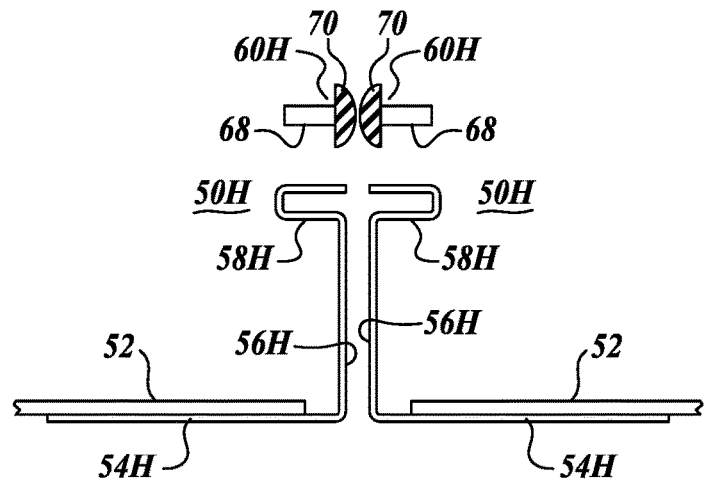

Referring to FIG. 9, the seal 60H is constructed with a stem portion 68 and a forward head portion 70. The stem portion 68 is sized to be retained within seat 58H. The head portion 70 is in the shape of a partial circle, with a rounded forward surface that projects forwardly of the forward face of the mating flange portion 56H. It is to be understood that the head portion 70 of the seal 60H can be of other shapes, such as square, rectangular, triangular, oval, elliptical, etc.

Figure 10:
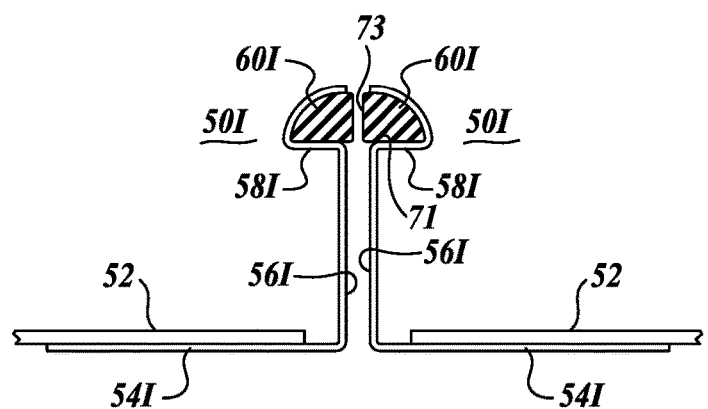

Referring to FIG. 10, the seal 60I is in the form of a quarter-circle having a curved outer surface intersecting with the flat base portion 71 and a flat face 73 extending transversely to the base portion 71 of the seal. The face portion 73 of the seal projects forwardly from the forward surface of the mating flange portion 56I of the flanged connector 50I. The seat 58I is shaped to correspond to the shape of the seal 60I.

Figure 11:
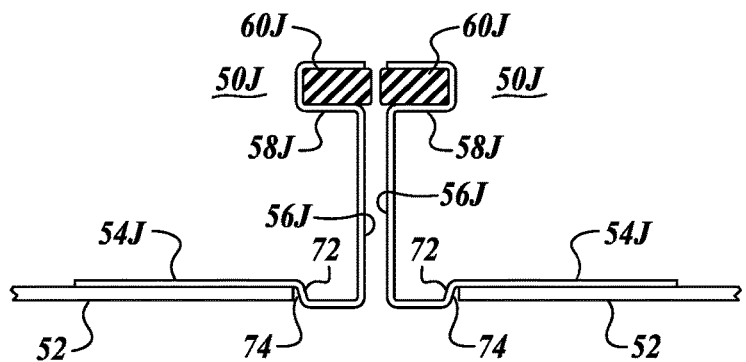
FIGS. 11 and 12 illustrate, in partial cross-section, pairs of flanged ring connectors wherein the insertion flange is formed to define an abutment for the end portions of the duct sections being attached together.

FIG. 11 illustrates a flanged ring connector 50J that is similar in construction to the flanged ring connector 50A, described above, but with the insertion flange 54J disposed to the exterior of HVAC duct 52. A "dogleg" or offset bend 72 is formed in the insertion flange so that the portion of the insertion flange between the mating flange 56J and the end of the duct 52 is substantially flush with the inside surface of the duct 52. The dogleg bend forms an abutment 74 for serving as a stop for the end of duct 52.

Figure 12:
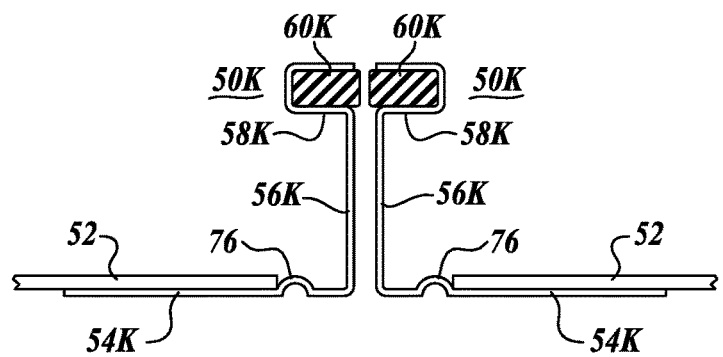

FIG. 12 also illustrates a flanged ring connector 50K that is similar in construction to the flanged ring connector 50A, described above, but with insertion flange 54K formed with a curved abutment or bead 76 projecting outwardly or laterally from the insertion flange. The abutment or bead 76 serves as a stop for the end of the duct 52.

FIGS. 13-19 illustrate flanged connectors 50L-50R having a second seal member 80 held within a seat 82 formed in the insertion flange 54. The second seal member 80 seals against the inside diameter of the HVAC ducting 52. The seal 80 can be held within seat 82 by use of an adhesive, by tension, or by other means.

Figure 13:
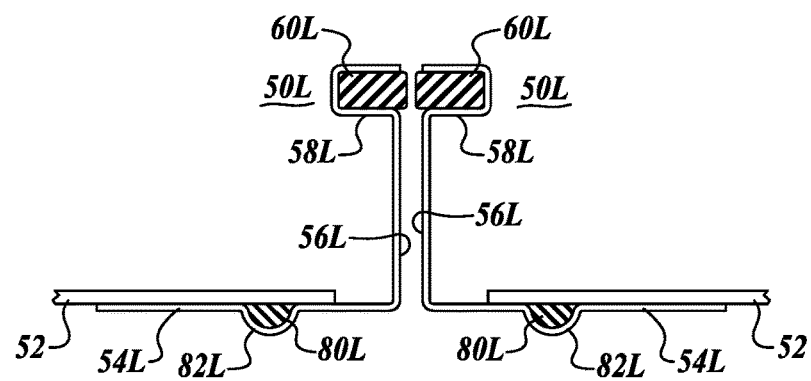
FIGS. 13-19 illustrate, in partial cross-section, pairs of flanged ring connectors corresponding to the present disclosure, utilizing a second seal for sealing the flanged ring against the inner wall of the duct sections being attached together.

Referring to FIG. 13, the flanged connector 50L is constructed similarly to flanged connector 50A, but with a generally curved or semicircular shaped seat 82L formed in the insertion flange portion 54L. The seat 82L is sized and shaped to receive a seal 80L that projects from the seat 82L to bear against the inside surface of duct 52. This helps to provide a seal between the flanged connector 50L and the duct 52.

Figure 14:
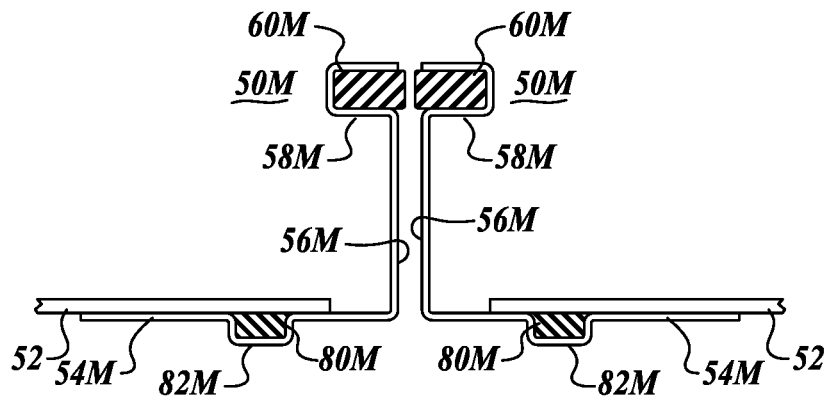

Referring to FIG. 14, the flanged ring connector 50M is similar to the flanged ring connector 50L shown in FIG. 13, but with the seal 80M being generally rectangular in cross-sectional shape. Correspondingly, the seat 82M is shaped to match the shape of the seal 80M.

Figure 15:
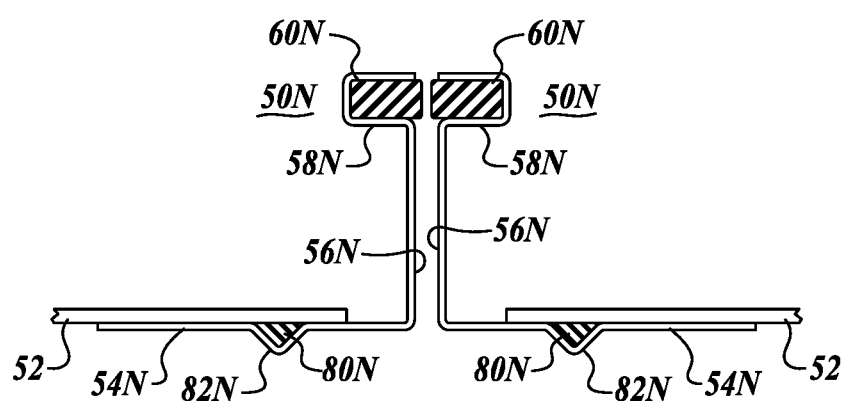

Referring to FIG. 15, the flanged ring connector 50N shown therein is similar to the flanged ring connector 50L, but with the seal 80N having a generally triangular cross-section rather than the semicircular cross-section used with flanged connector 50L. Correspondingly, the seat 82N is formed in a shape to match the cross-sectional shape of seal 80N.

Figure 16:
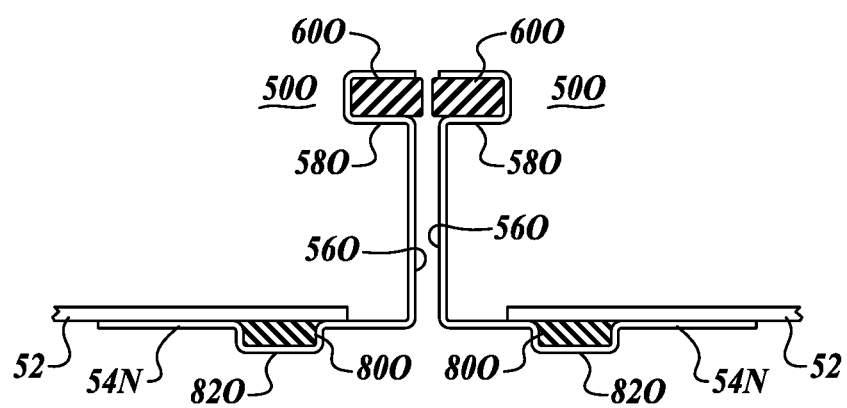

Referring to FIG. 16, the flanged connector 50O utilizes a second seal 80O that is similar in shape to seal 80M shown in FIG. 14 but with a greater width, which may be desirable in situations in which the ducting 52 is used in conjunction with higher pressures. The seat 82O is shaped and sized to match the shape and size of the second seal 80O.

Figure 17:
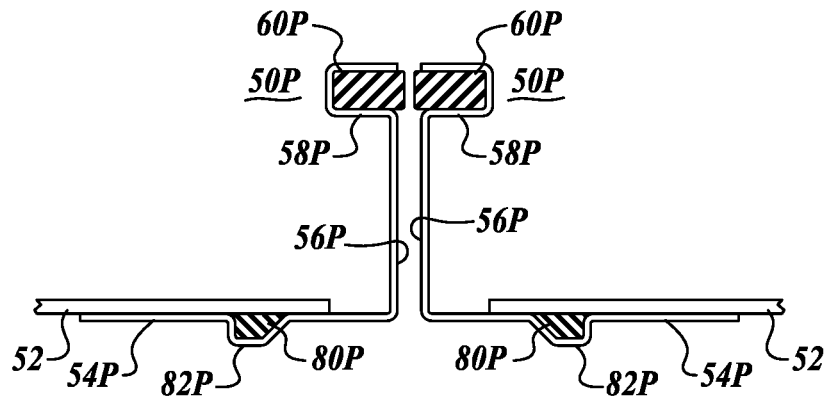
Figure 18:
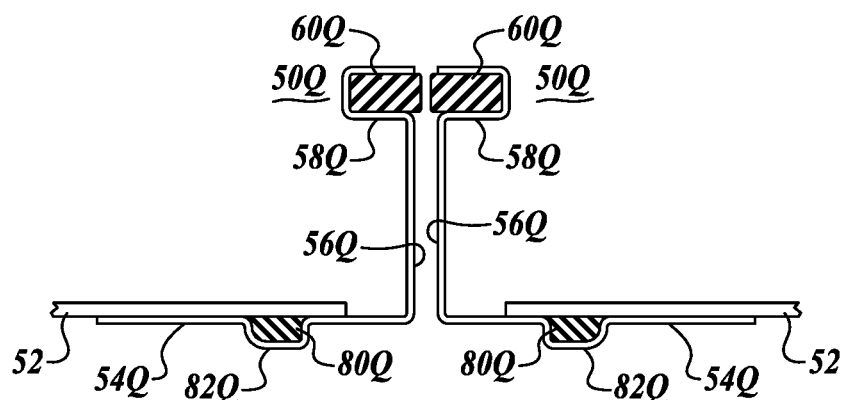
Figure 19:
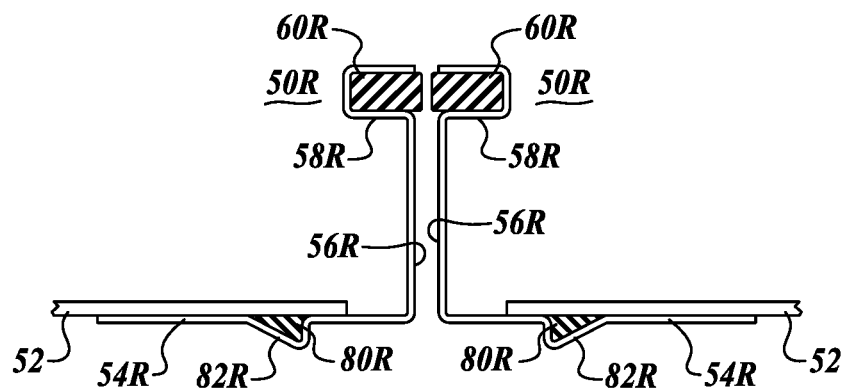

FIGS. 17-19 illustrate flanged ring connectors 50P, 50Q, and 50R, each with a second seal 80P, 80Q, and 80R of a specific cross-sectional shape, and each with a seat 82P, 82Q, and 82R of a shape to match the corresponding seal. In FIG. 17 the seal 80P is generally rectilinear, with one end being "square" and the opposite end (toward mating flange portion 56P) being sloped. The second seal 80Q is shaped somewhat oppositely to that of seal 80P in that the end of the seal closest to the mating flange 56Q is "square," whereas the opposite end of the seal is rounded. The seal 80R shown in FIG. 19 is shaped generally in the form of a right triangle, with the base portion of the triangle forming the end of the seal located closer to the mating flange portion 56R.

FIGS. 20-26 illustrate flanged ring connectors 50S-50Y adapted to receive reinforcing members 90, which may be in the form of solid metallic beads, or similar members captured within a closed or substantially closed seat 58 formed in the mating flange 56. It will be appreciated that the reinforcing member 90 serves to increase the section modulus of the flanged ring connector, thereby to improve its structural integrity, strength, and stiffness. As with seat 58 shown in FIGS. 1-19, the seat 58 shown in FIGS. 20-26 can extend around the outer perimeter portion of mating flange 56, or can be inward of the outer perimeter portion.

Figure 20:
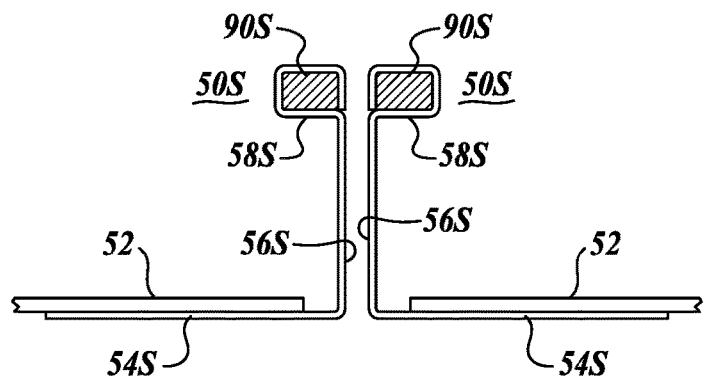
FIGS. 20-24 illustrate pairs of flanged ring connectors wherein reinforcing beads or members are positioned within seats formed in the mating flanges of the connectors.
Figure 21:
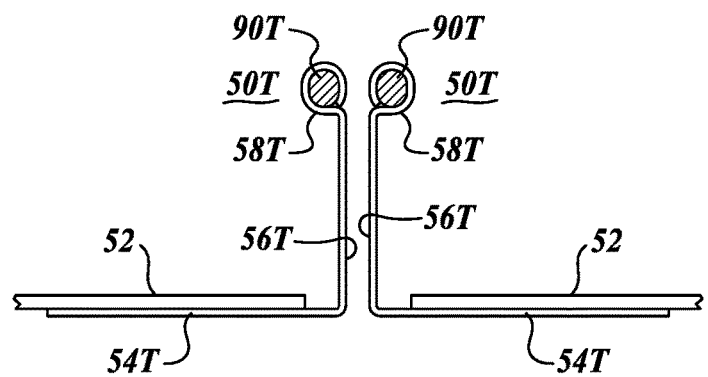
Figure 22:
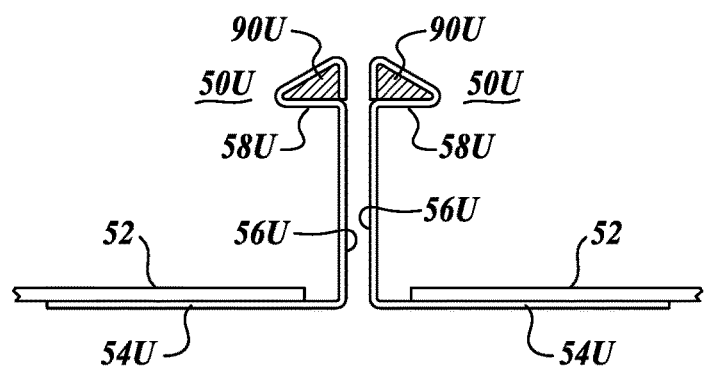
Figure 23:
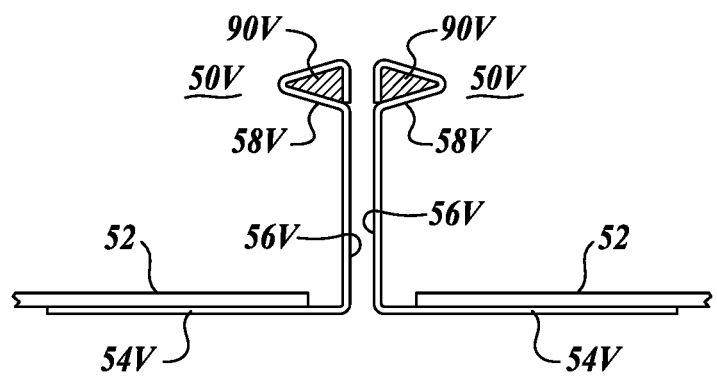
Figure 24:
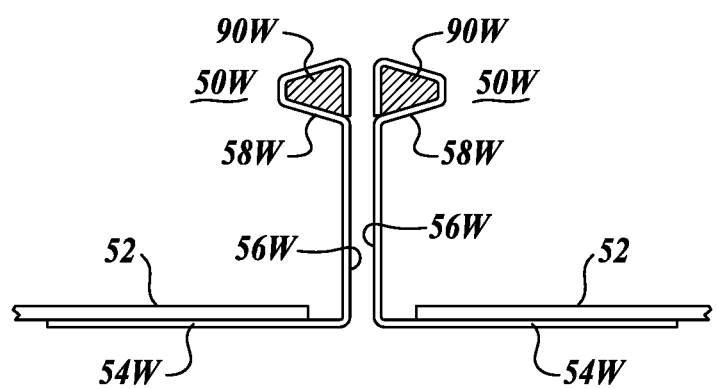

Referring to FIG. 20, the reinforcing member/bead 90S is generally rectangular in shape and substantially enclosed within a seat 58S. As in the other flanged ring connectors described above, flanged ring connector 50S includes an annular mating flange portion 56S and an insertion flange portion 54S.

FIGS. 21-24 illustrate flanged ring connectors 50T, 50U, 50V, and 50W, each constructed similarly to flanged ring connector 50S but with the reinforcing members 90T, 90U, 90V, and 90W of various shapes. For example, in FIG. 21 the flanged connector 50T utilizes a reinforcing member 90T that is generally oval in shape, but could also be circular or elliptical in shape. In the flanged ring connector 50U the reinforcing member 90U is in the form of a right triangle, whereas in flanged ring connector 50V the reinforcing member 90V is in the shape of a symmetrical triangle. The reinforcing member 90W of flanged ring connector 50W is in the form of a truncated triangle. Of course, the reinforcing member 90 can be of shapes other than those illustrated or described above. Moreover, the reinforcing member can be composed of various materials, for instance, a high modulus metallic material such as steel or a steel alloy.

Figure 25:
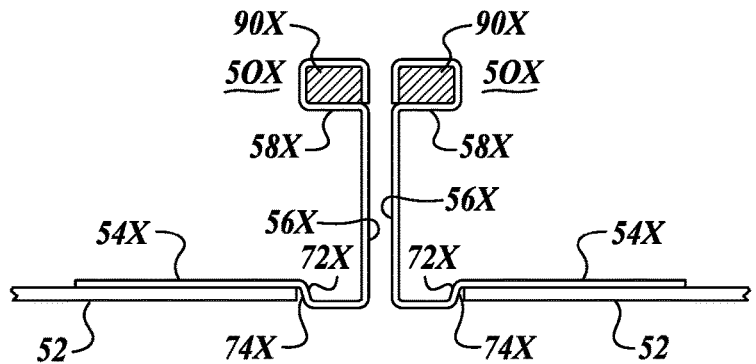
FIGS. 25 and 26 are similar to FIG. 20, but illustrate abutments formed in the insertion flanges, similar to FIGS. 11 and 12.
Figure 26:
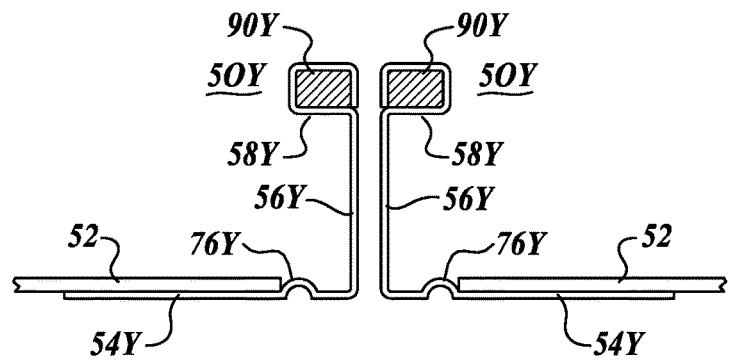

FIGS. 25 and 26 illustrate flanged ring connectors 50X and 50Y having insertion flanges 54X and 54Y corresponding to the insertion flanges 54J and 54K, described above. As shown in FIG. 25, the insertion flange 54X is disposed to the exterior of HVAC duct 52. A "dogleg" or offset bend 72X is formed in the insertion flange so that the portion of the insertion flange between the mating flange 52X and the distal end of the duct 52 is substantially flush with the inside surface of the duct 52. In addition, the dogleg bend forms an abutment 74X for serving as a stop for the end of duct 52.

In FIG. 26 the insertion flange 54Y is formed with a curved abutment or bead 76Y projecting outwardly or laterally from the insertion flange. The abutment or bead 76Y serves as a stop for the adjacent end portion of the duct 52.

Figure 27:
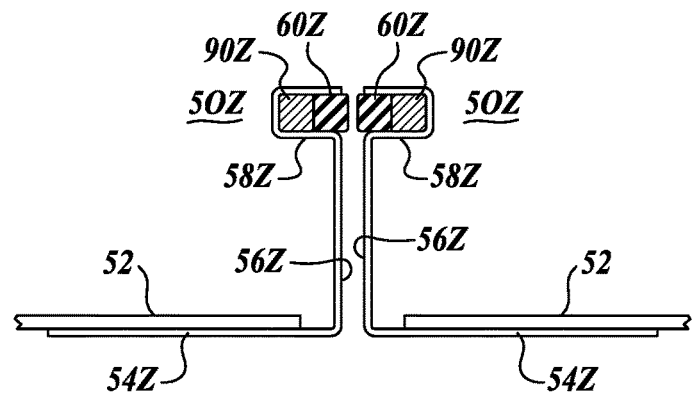
FIG. 27 illustrates, in partial cross-section, a pair of flanged ring connectors utilizing seal members and reinforcing members.

The present disclosure contemplates utilizing both a reinforcing member 90 and a seal member 60 within a seat 58 formed along the perimeter portion of a mating flange 56. In this regard, as shown in FIG. 27, a reinforcing member 90Z can be located at the base of the seat 58Z while a seal member 60Z may be positioned against the reinforcing member 90Z to project from the seat 58Z forwardly of the front surface of the mating flange 56Z of the flanged ring connector 50Z. Of course, reinforcing members 90 and seal members 60 can be of other shapes, with the seat 58 configured accordingly.

FIGS. 28-39 illustrate another aspect of the present disclosure, wherein a flanged ring connector 150 is utilized in conjunction with a double-wall HVAC duct system 151. The HVAC duct 151 includes an outer wall 152 and an inner wall 154 separated by insulation or similar material 156. The flanged ring connector 150 includes a first outer insertion flange 160 sized to overlap the inside diameter of duct outer wall 152. An outer mating flange 162 extends transversely, laterally from the outer insertion flange 160. A formed seat 164 extends along the outer mating flange 162, and is shaped to receive a seal member 166 therein. As in the prior embodiments of the present disclosure, the seal member 166 can project forwardly from the front surface of the outer mating flange 162. Also, the seat 164 can be of various shapes; for example, as shown in FIGS. 1-9 above. Although the seat 164 is shown to extend around the outer perimeter portion of the mating flange 162, the seat can be located inward of the outer perimeter of the mating flange.

Figure 31:
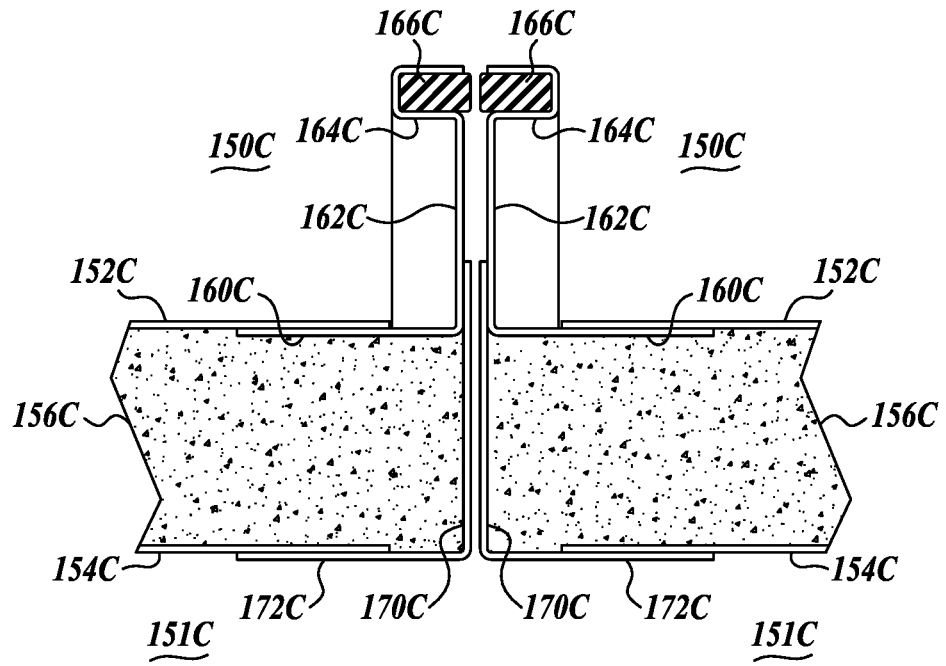
Figure 32:
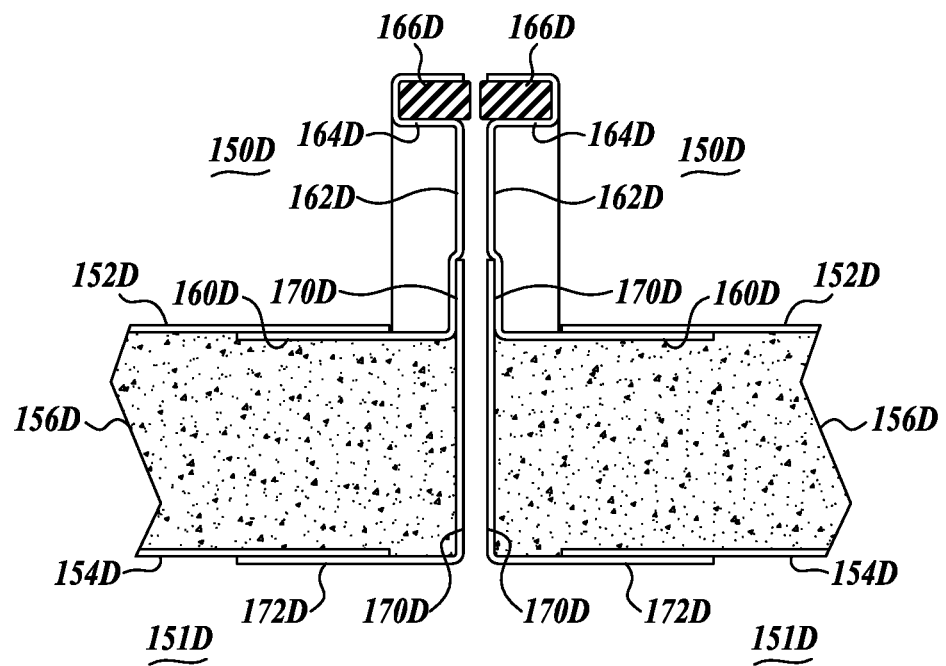
Figure 37:
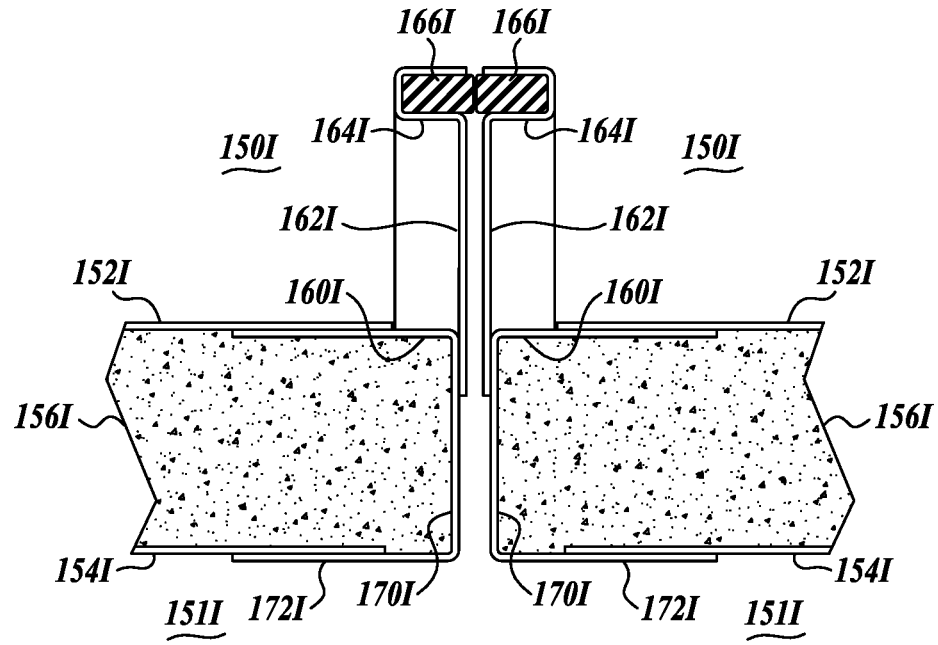
Figure 39:
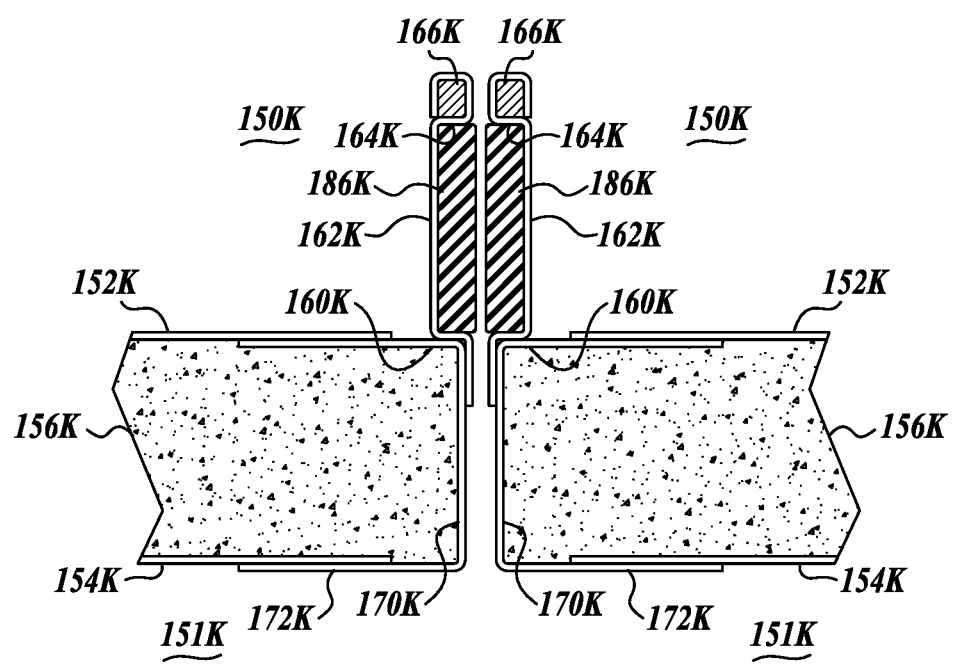

The flanged connector 150 also includes an inner mating flange portion 170 and an inner insertion flange portion 172 that overlaps the inner surface of the inner duct 154. The inner mating flange 170 is preferably coplanar with the outer insertion flange 160. However, as shown in FIGS. 31 and 32, the inner mating flange 126 may overlap the outer mating flange 162 or, as shown in FIGS. 37 and 39, the outer mating flange 162 may overlap the inner mating flange 126. It is to be appreciated that the inner mating flange 170 may be attached to the outer mating flange 162 and/or outer insertion flange 160 in any known manner, including by weldments.

It is also to be appreciated that the inner insertion flanges 172 may be formed to receive a second seal in the manner of FIGS. 13-19 above. Moreover, the seats 164 in the flanged ring connectors shown in FIGS. 28-39 may be adapted to receive a reinforcing member, for example, as shown in FIGS. 20-26. Also, as discussed above, the seats 164 may be adapted to receive both a reinforcing member and a seal member.

Figure 28:
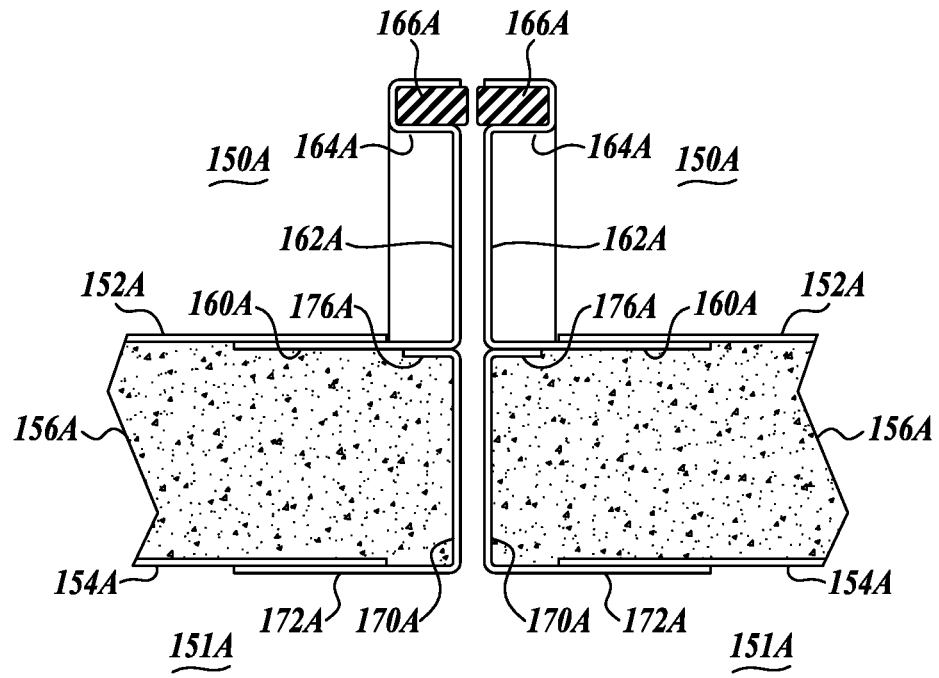
FIGS. 28, 29, and 31-37 illustrate, in partial cross-section, pairs of flanged ring connectors for interconnecting double-wall HVAC ducting, wherein seats are formed along the exterior of the mating flanges for receiving seal members, with the understanding that the seats can instead, or in addition, receive reinforcing members to increase the section modulus of the flanged ring connectors.
Figure 29:
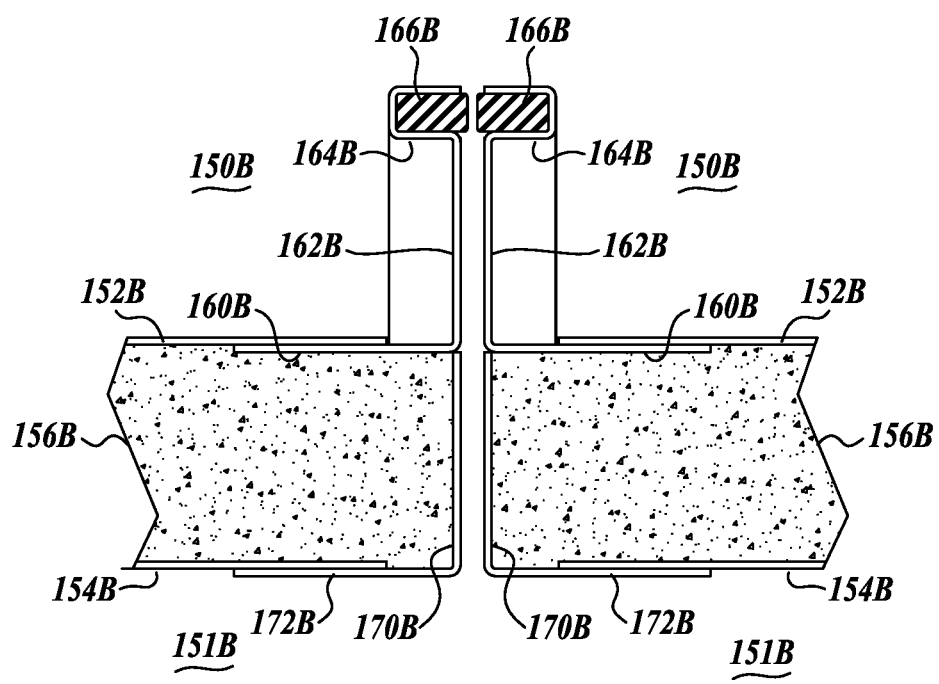

Referring to FIG. 28, the double-wall flanged ring connector 150A is constructed in the manner described above, generally with respect to the embodiments of the present disclosure shown in FIGS. 28-39. In the connector 150A, as well as in the connectors 150B-150K, the seal members 166A-166K are illustrated as of a generally rectangular cross-section. However, such seal members may be in other cross-sectional shapes, as described above.

Also, in the connector 150A, shown in FIG. 28, a return section 176A extends parallel to the outer insertion flange 160A to overlap the inside surface of the outer insertion flange, thereby increasing the strength of the flanged ring connector. In the flanged ring connector 150B, shown in FIG. 29, the inter-mating flange 170 intersects with the corner formed by the outer mating flange 162B and outer insertion flange 160B.

Figure 30:
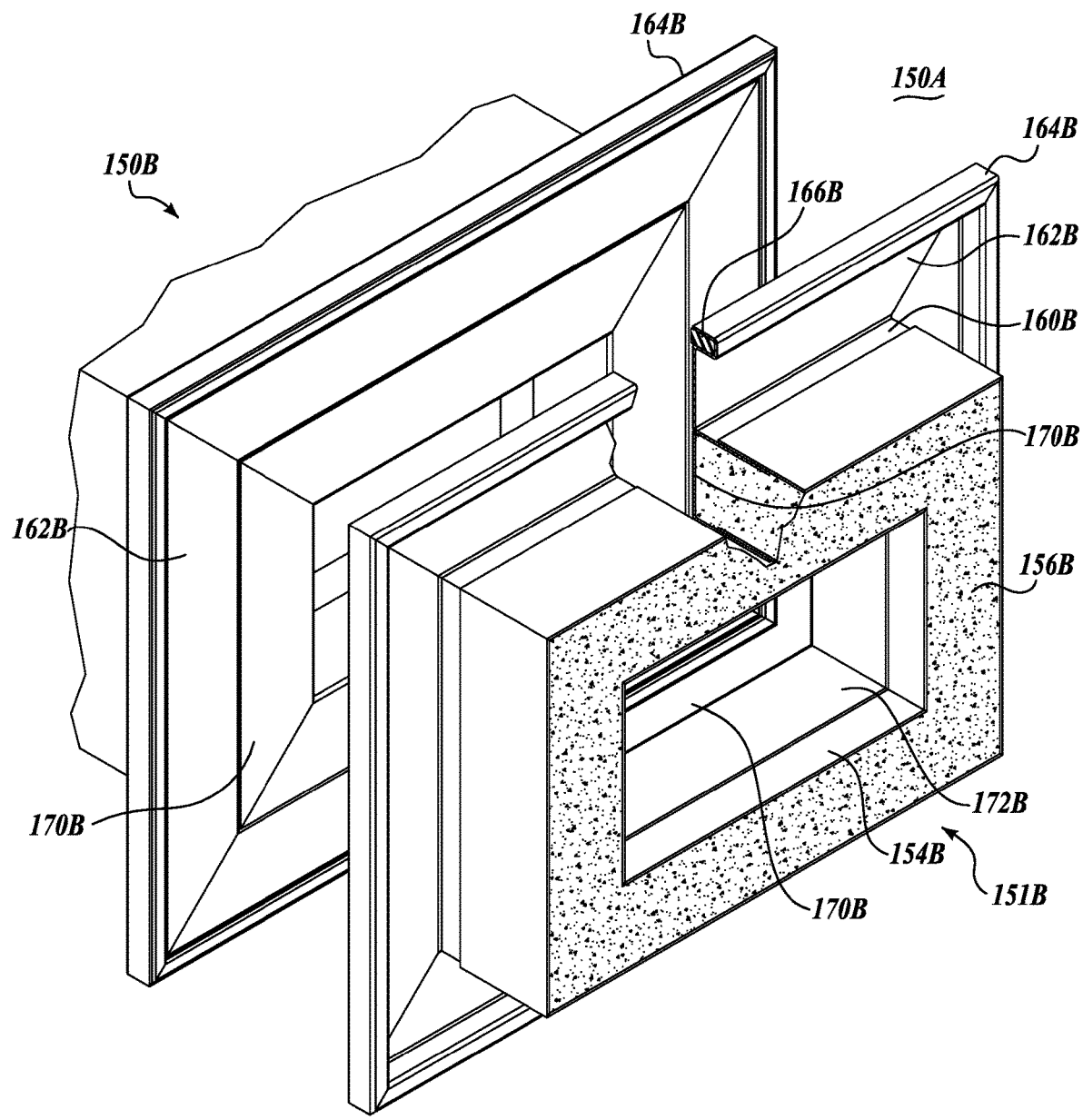
FIG. 30 is an isometric view of the flanged ring connector of FIG. 29, shown in conjunction with rectilinear, double-wall HVAC ducting.

FIG. 30 is an isometric view of flanged ring connectors 150B utilized to interconnect the adjacent ends of double-wall ducts 151B. Although the double-wall ducts 151B are shown as being of a rectangular cross-section, the flanged ring connectors 150 can be utilized with double-wall ducts of other cross-sectional shapes, including, for example, round, oval, square, triangular, etc. Also, the size or width of the outer mating flange 162B can be varied depending on various factors, such as the size of the ducting, the pressure required to be carried by the ducting, the thickness of the material comprising the ducting, etc.

Referring to FIGS. 31 and 32, the inner mating flanges 170C and 170D overlap a portion of the outer mating flanges 162C and 162D so as to improve the strength and stiffness of the mating flange portion of the connectors 150C and 260D. In FIG. 31, the inner mating flange 170C simply overlaps the corresponding outer mating flange 162C. In FIG. 32, on the other hand, the inner portion 178D of the outer mating flange 162D is slightly offset in the region of the overlapping inner mating flange 170D so that the outer and inner mating flanges form a coplanar outward or forward surface or face.

Figure 33:
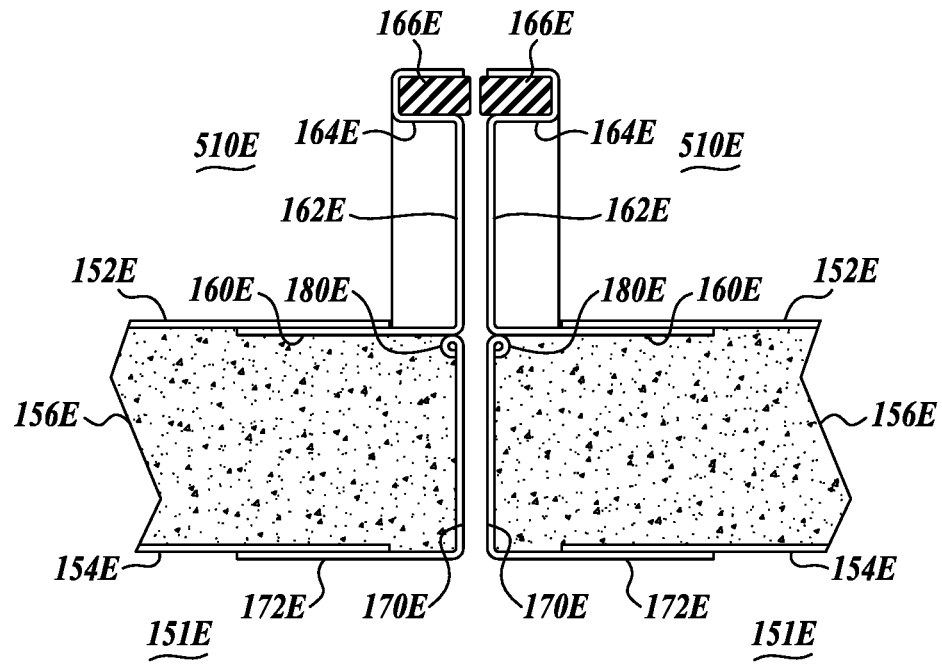

Referring to FIG. 33, the outer end portion of the inner mating flange 170E is formed into a circle or bead 180E, thereby to reinforce the inner mating flange at this location. The bead 180E is shown as substantially circular in shape, but of course beads of other cross-sectional shapes may also be utilized.

Figure 34:
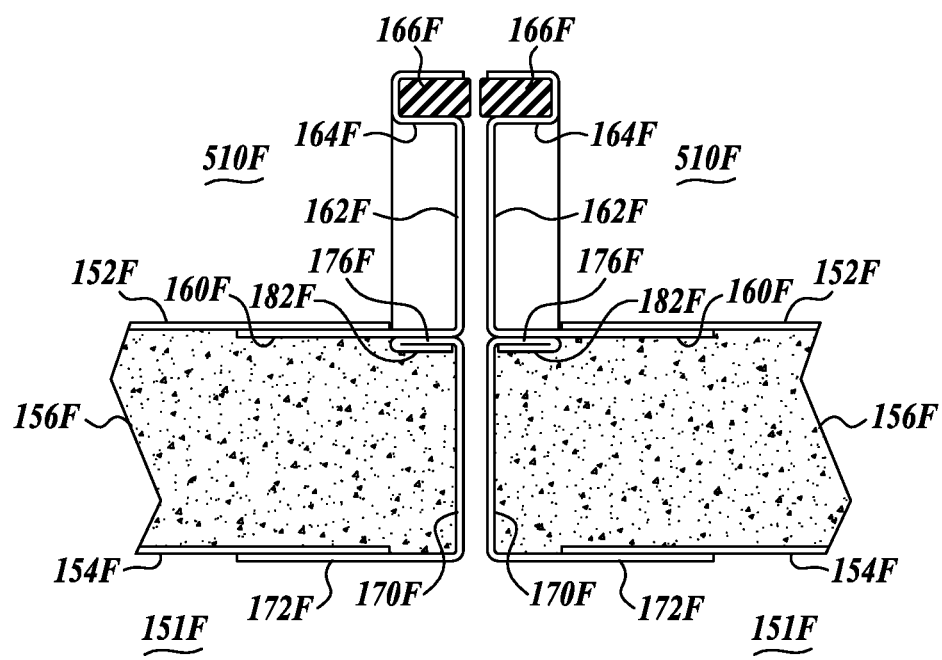

Referring to FIG. 34, the double-wall flanged ring connector 150F is constructed with a return section 176F formed in the outer perimeter portion of the inner mating flange 170F. In addition, a hem portion 182F overlaps the underside of the return portion 176F, thereby to provide additional structural integrity and strength to the double-wall flanged ring connector 150F.

Figure 35:
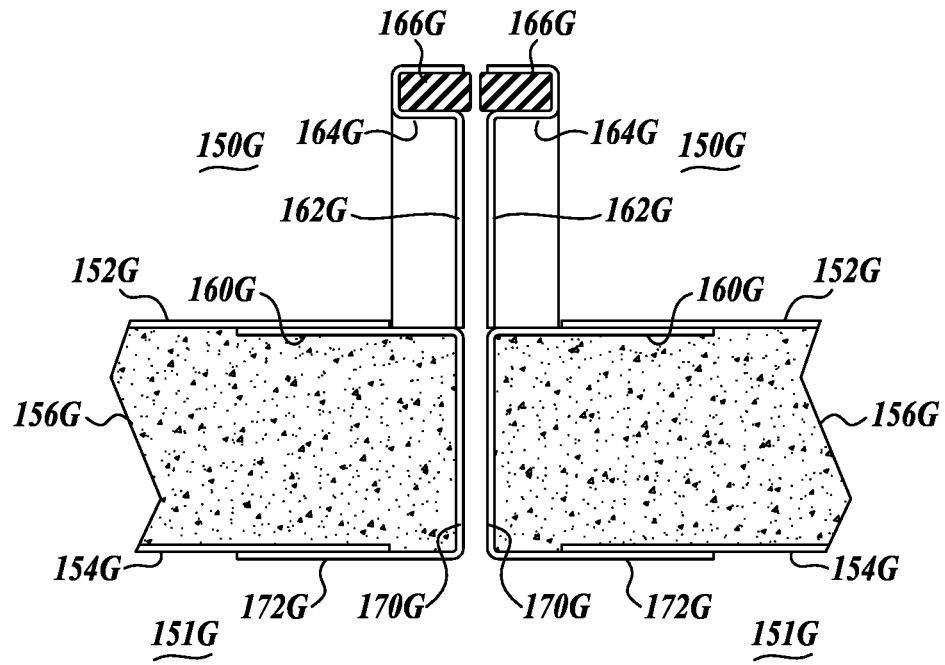

Referring to FIG. 35, in the illustrated flanged ring connector 150G the outer insertion flange 160G is illustrated as integrally formed with the inner mating flange 170G rather than constructed with the outer mating flange 162G. As such, the inner perimeter of the outer mating flange 162G is attached to the corner defined by the inner mating flange 170 and the outer insertion flange 160G.

Figure 36:
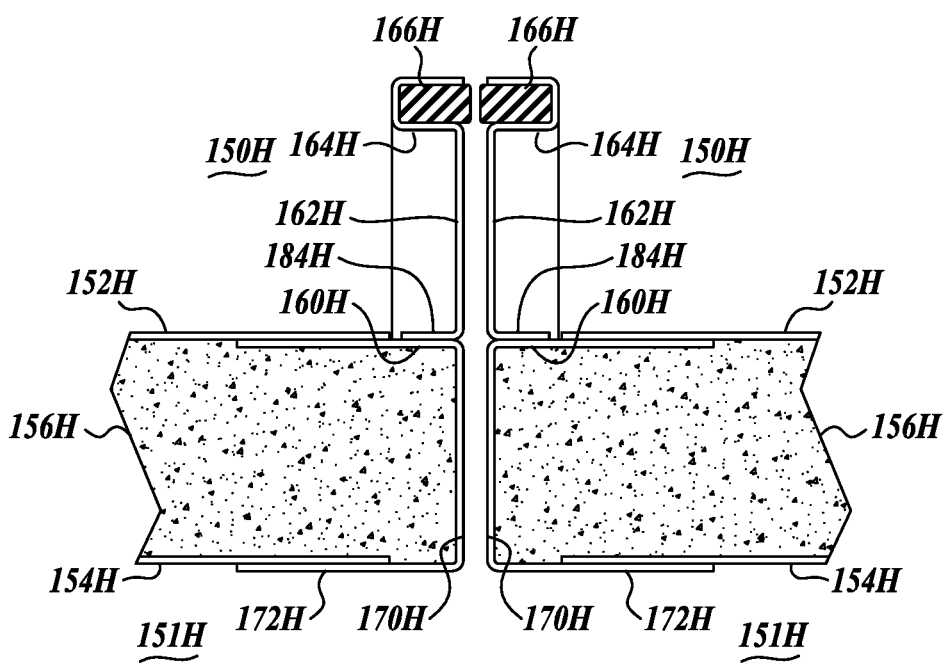

Referring to FIG. 36, the flanged wall connector 150H shown therein is similar to the flanged wall connector 50G described above, but with a reinforcing flange 184H formed in the inside perimeter of the outer mating flange 162H to overlap the exterior of the outer insertion flange 160H, which is constructed integrally with the inner mating flange 170H in the manner similar to that shown in FIG. 35.

Referring to FIG. 37, the double-wall flanged ring connector 150I is constructed similarly to the flanged ring connector 150G shown in FIG. 35. However, in the flanged ring connector 150I, the outer mating flange 162I overlaps the inner mating flange 170I.

Figure 38:
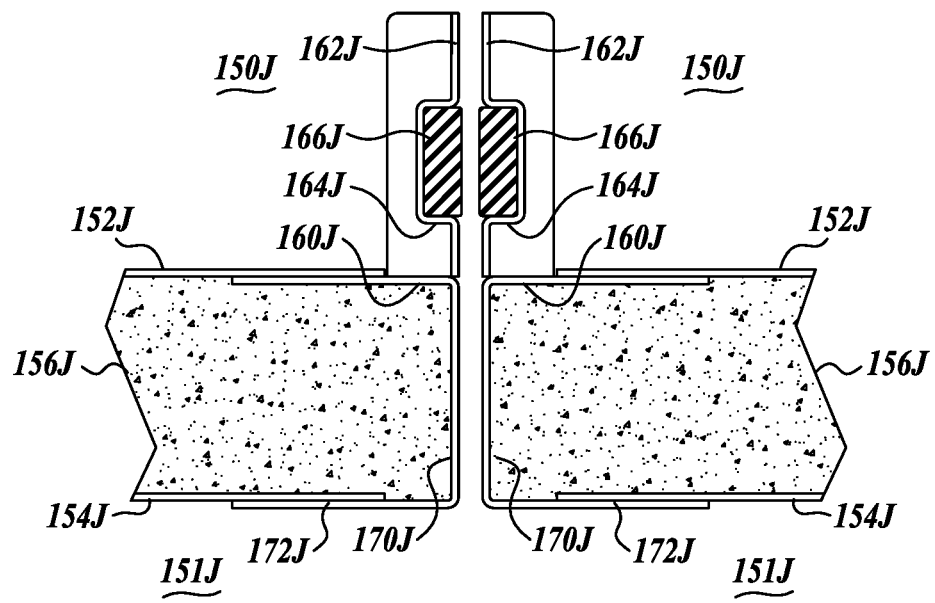
FIGS. 38 and 39 illustrate, in partial cross-section, pairs of flanged ring connectors for interconnecting double-wall HVAC ducting, with the seal members for sealing the flanged ring connectors extending along a significant portion of the height of the mating flange faces.

Referring to FIG. 38, a double-wall flanged ring connector 50J is constructed similarly to the flanged ring connector 50G shown in FIG. 35, but with the seal member 166J extending along the mating flange 162J between the inner and outer perimeters of the mating flange. In this regard, a longitudinal seat 164J is formed in the mating flange portion 162J to receive a seal 166J that extends along a substantial portion of the width of the mating flange. The other aspects of the flanged ring connector 150J shown in FIG. 38 are similar to those of FIG. 135, and thus such aspects of the flanged ring connector 150J will not be repeated here. It will be appreciated that, by the construction of the flanged ring connector 150J shown in FIG. 38, a substantial sealing area is provided.

Referring to FIG. 39, a flanged ring connector 150K is constructed as a modified version of the flanged ring connector 150I shown in FIG. 37. The flanged ring connector 150K is constructed with a different mating flange section than in FIG. 37, wherein a substantial portion of the mating flange serves as a seat for receiving a relatively wide (in the radial or outward direction) seal 186K to seal against a mating seal 186K of the opposite flanged ring connector. In addition, a seat 164K is formed in the outer perimeter portion of the mating flange portion 162K to receive a reinforcing member 166K, which may be of a composition the same or similar to the reinforcing rings/beads 90, discussed above. It will be appreciated that the construction of the flanged ring connector 150K, shown in FIG. 39, results in a relatively large seal area as well as providing a reinforced flanged ring connector. The aspects of the flanged ring connector 150K that are the same or similar to the flanged ring connector 150I will not be described here, to avoid duplication.

It is to be understood that the configuration of the mating flanges 162J of flanged ring connector 150J and mating flange 162K of flanged ring connector 150K could be incorporated into the other flanged ring connectors described above, including flanged ring connectors for single-wall and multiple-wall ducting.

The ducts 151 shown in FIGS. 28-39 may be of various cross-sectional shapes, such as round, oval, square, rectangular, triangular, etc.

The flanged ring connectors of the present disclosure can be manufactured by different techniques, as described more fully below. The flanged ring connectors of the present disclosure may be manufactured solely by spin-forming, solely by roll-forming, solely by stamping, or by a combination thereof. Also, the starting work material for the flanged connector may be composed of strip stock that is first formed into a ring and then the profile of the flanged connector formed therein. Alternatively, the profile for the flanged connector could be first formed into the strip stock and then the strip stock formed into a ring to match the cross-sectional shape of the HVAC ducting. Further, the beginning workpiece may be annular in shape, with the profile of the flanged ring connector stamped therein. As a further alternative, the work material may be a square or circular sheet, wherein a stamping process is utilized whereby several flanged ring connectors are stamped out of the workpiece at the same time, each of various sizes so that the flanged ring connectors are nested, one within the other. The following description provides some examples of forming flanged ring connectors in accordance with the present disclosure.

Figure 40A:
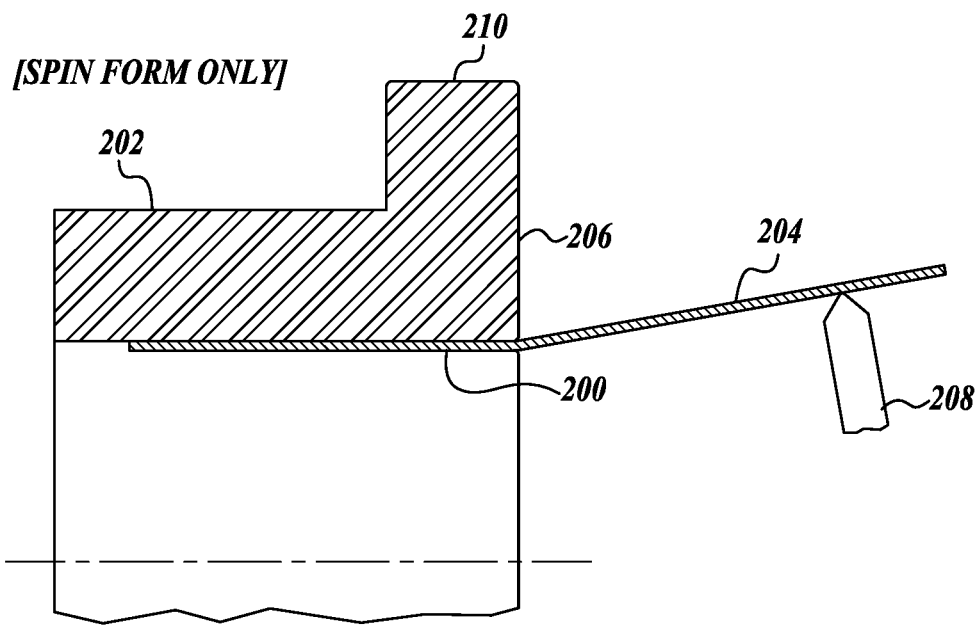
FIGS. 40A-40E illustrate one method of forming the flanged ring connectors of the present disclosure.
Figure 40B:
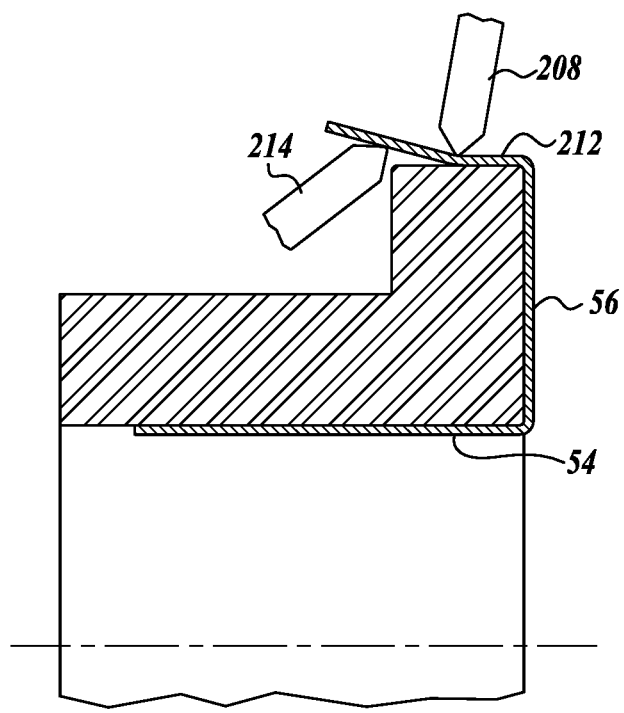
Figure 40C:
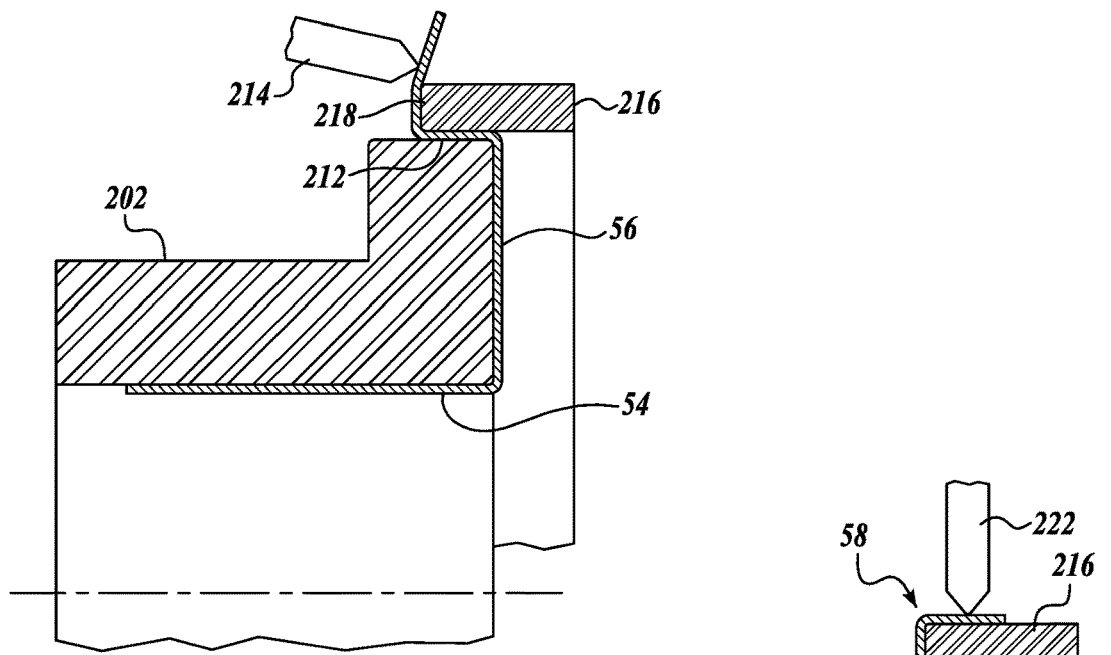
Figure 40D:
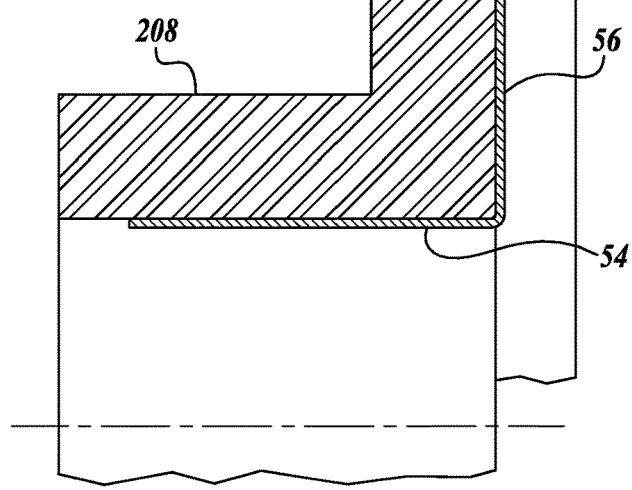
Figure 40E:
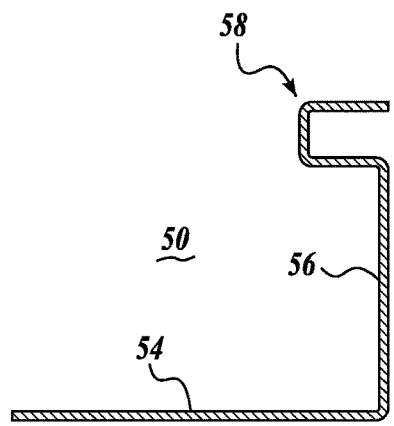

FIGS. 40A-40E illustrate one manner of forming flanged ring connectors according to the present disclosure. In FIG. 40A, a round collar-shaped workpiece 200 is held within a spin die 202 so that a portion 204 of the workpiece 200 extends beyond the forward face 206 of the spin die. Such projecting portion 204 of the workpiece 200 is bent or turned outwardly against the forward face 206 by a tool 208 while the workpiece is spinning within the spin die 202. Thereafter, the same tool 208, or a different tool, is used to form the workpiece against the outer perimeter 210 of the die 202, and then with the tool 208 pressed against the formed return portion 212, a second tool 214 pushes upwardly against the underside of the return 212, as shown in FIGS. 40B and 40C. As shown in FIG. 40C, a second die member 216 can overlie the return section 212 so that the tool 214 presses against the end 218 of the die member 216 to form the base of the seat 58. The seat 58 is completed by tool 214 or a different tool 222, pressing downwardly against the workpiece to press the workpiece against the outer surface of the die 216, thereby to complete the generally rectangularly shaped seat 58. Rather than using a second die member 216, a tool with a roller at its end can be positioned so that the perimeter of the roller portion is located where the end 218 of the die is located.

The collar-shaped workpiece 200 can be formed from flat stock by numerous techniques, including roll forming (see FIG. 43A) or stamping, for example.

Figure 41A:
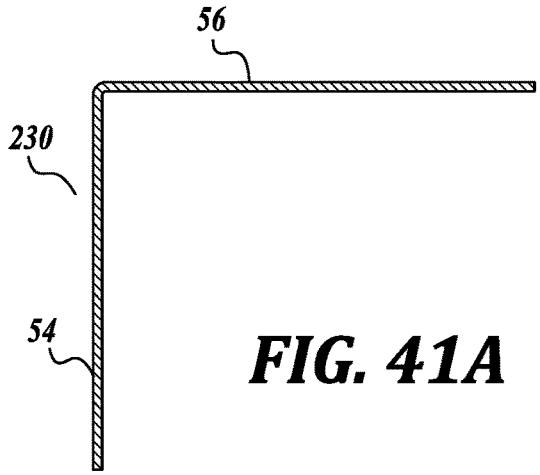
FIGS. 41A-41C illustrate another method of manufacturing the flanged ring connectors of the present disclosure.
Figure 41B:
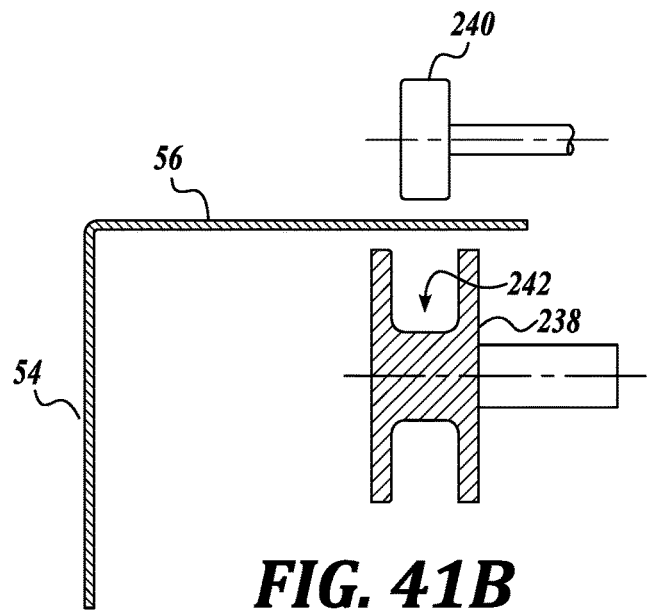
Figure 41C:
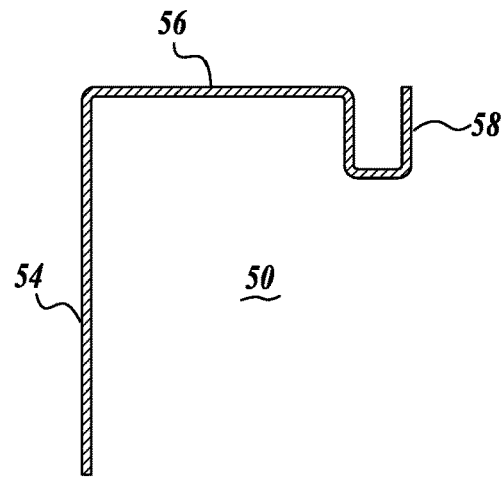

A second method of forming the flanged ring connector 50 is shown in FIGS. 41A-41C, wherein a workpiece 230 is formed with an insertion flange 54 and a mating flange 56 at right angles to each other. The workpiece 230 can be formed in this configuration in numerous ways, including by spin-forming (as shown in FIG. 40A), roll-forming, stamping, etc. As shown in FIG. 41B, the outer portion of the mating flange section 56 is disposed adjacent a female roller 238 under a male roller 240. The roller 238 includes a U-shaped cavity 242 into which the male roller 240 presses the outer portion of the mating flange 56 to form a seat 58 that may receive either a seal member and/or a reinforcing member. Although the seat 58 is shown in FIG. 41C as being of a rectangular cross-sectional shape, the seat can be in numerous other shapes, as discussed herein.

Figure 42A:
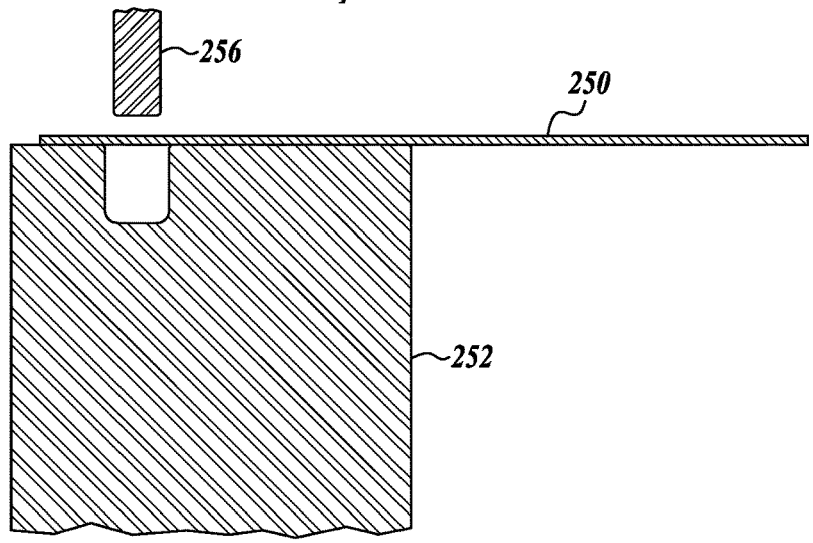
FIGS. 42A-42D illustrate a further method of manufacturing the flanged ring connectors of the present disclosure.
Figure 42B:
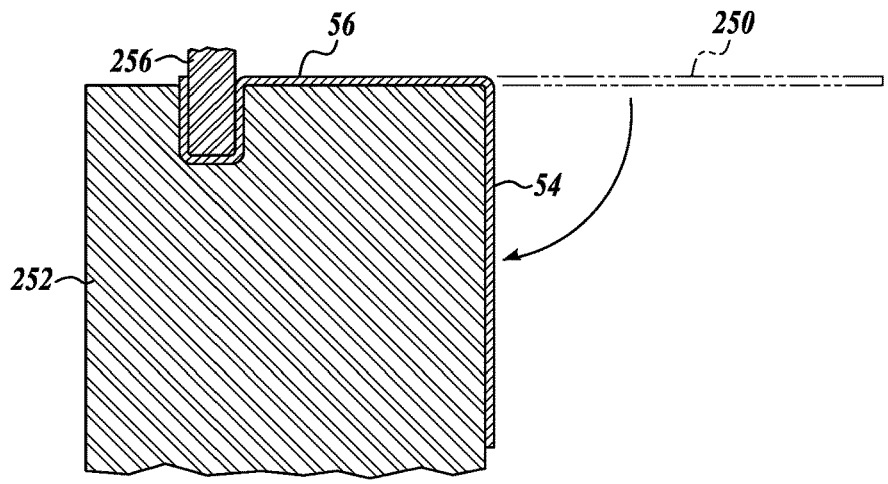

A further method of producing a flanged ring connector according to the present disclosure is shown in FIGS. 42A-42D. In FIG. 42A, a workpiece in the form of a longitudinal strip member 250 is placed against a stamping die 252 to form a U-shaped seat 58 by stamping the seat with die members 252 and 256. Thereafter, the formed strip stock is longitudinally bent to form an insertion flange portion 54 that is transverse to a mating flange 56, thereby resulting in the shape shown in FIG. 42C. The strip stock is next formed into a circular shape by utilizing a roll-forming apparatus 262, shown in FIG. 42D. Such apparatus includes roller sets 264-272 that are positioned so as to progressively increase the curvature of the formed longitudinal strip stock to result in a round flanged ring connector 50.

Figure 42C:
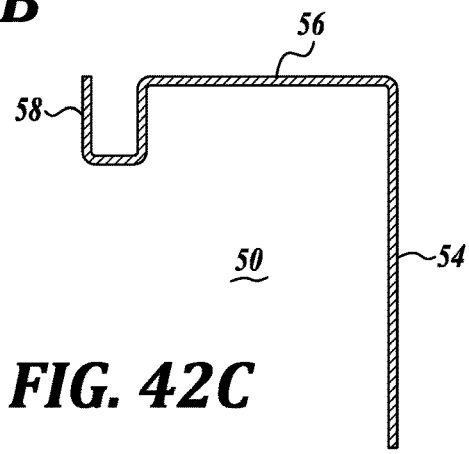
Figure 42D:
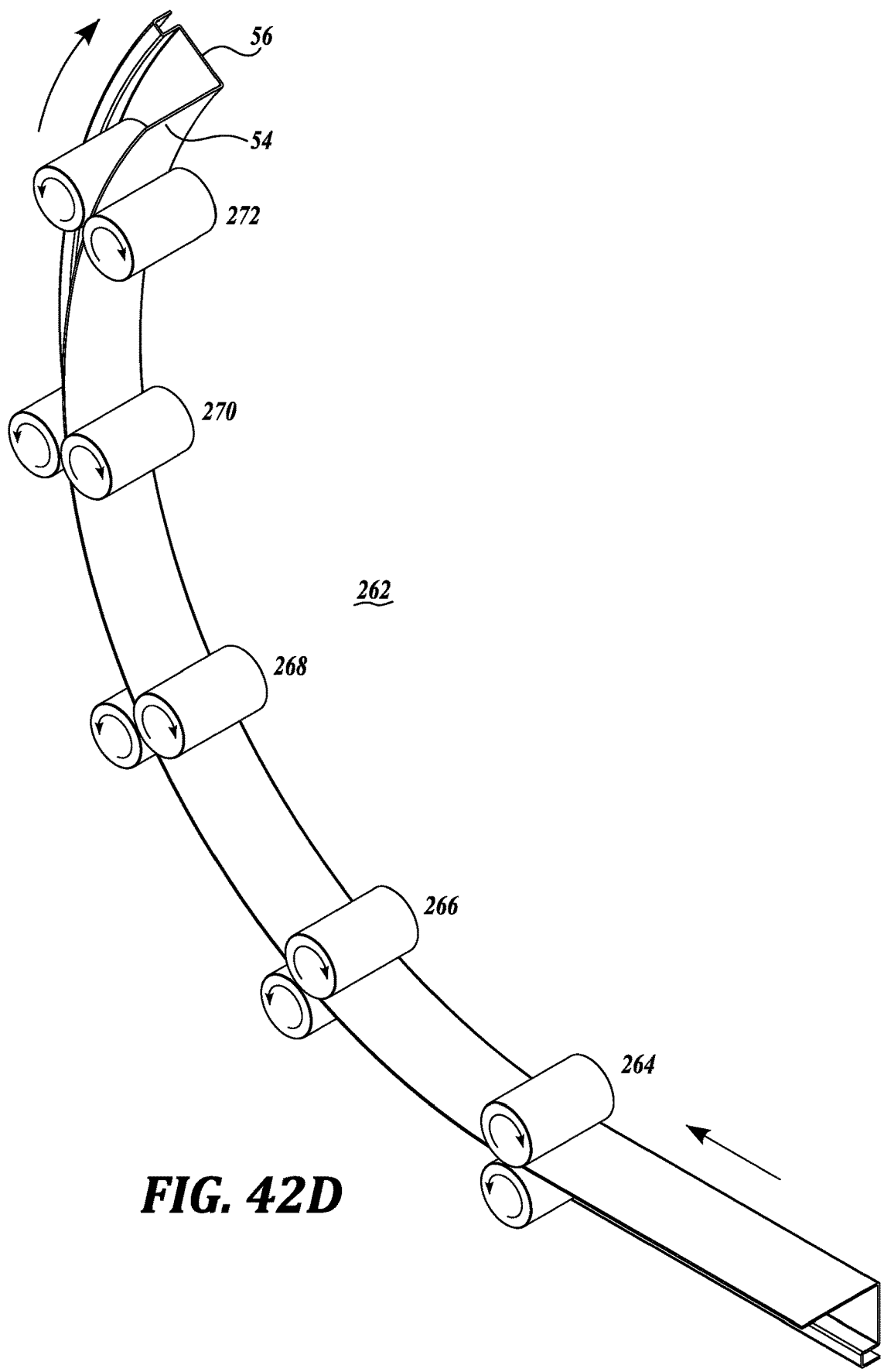

Rather than forming a round flanged ring connector, the semi-formed workpiece 250 of FIG. 42C can be drawn or bent around a mandrel that may be circular in shape but can be of other shapes, for example, rectangular, square, oval, etc. Moreover, rather than being drawn around a mandrel, the formed strip of FIG. 42C may be bent to form corners in a stamping machine or other bending apparatus, for example, as shown in FIGS. 84-91 of U.S. patent application Ser. No. 11/952,907, the entirety of which is incorporated herein by reference. Also incorporated by reference herein is the entirety of U.S. application Ser. No. 12/953,050, as well as U.S. Pat. Nos. 7,163,030 and 7,743,504, pertaining to flanged ring connectors and methods of manufacturing flanged ring connectors.

Figure 43A:
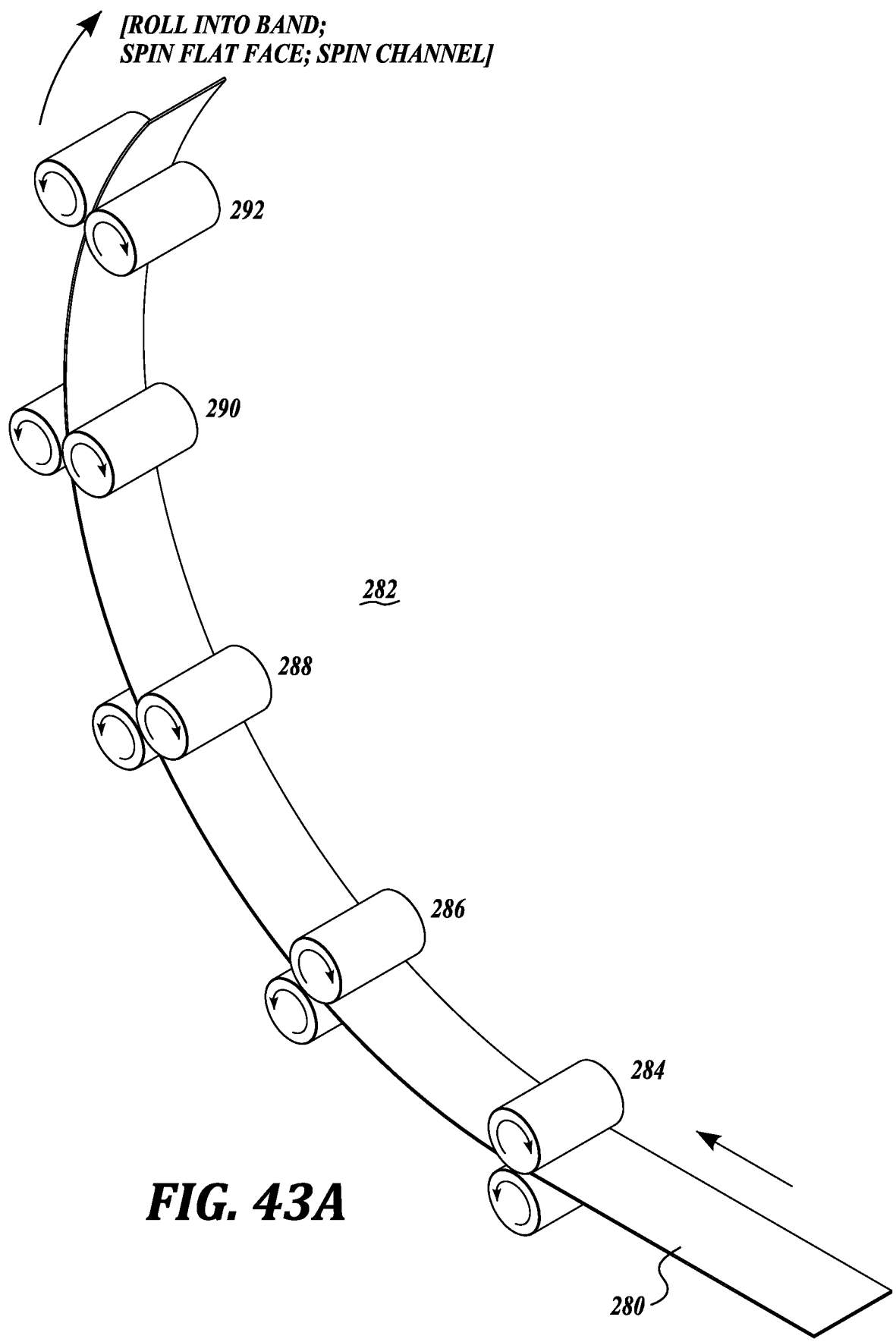
FIGS. 43A-43D illustrate a further method of manufacturing the flanged ring connectors of the present disclosure.
Figure 43B:
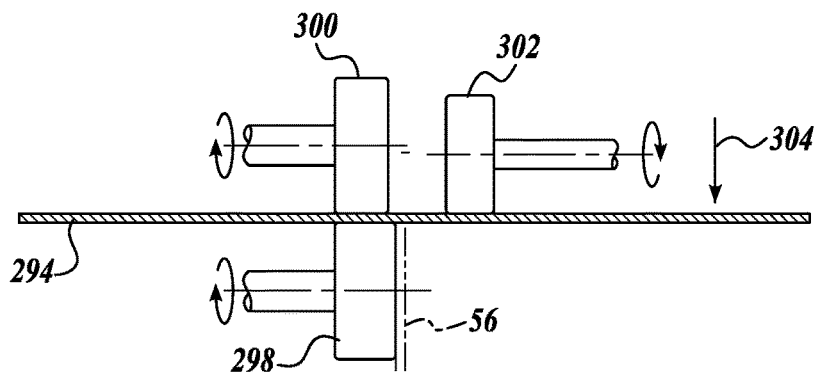
Figure 43C:
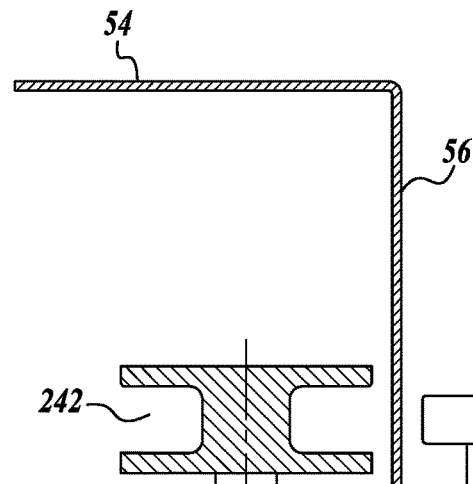
Figure 43D:
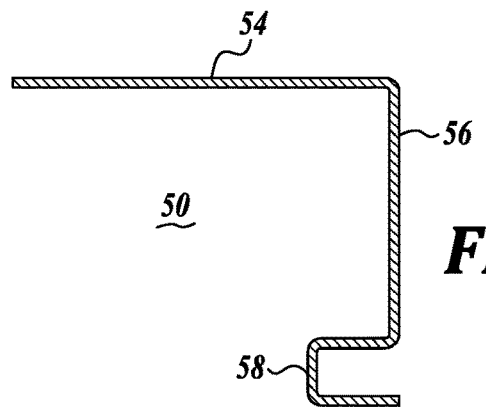

Another method of producing a flanged ring connector according to the present disclosure is illustrated in FIGS. 43A-43D. As shown in FIG. 43A, a workpiece initially in the form of a strip stock 280 is formed into a circular collar by roll-forming using a roll-forming apparatus 282. The apparatus 282 includes roller pairs 284, 286, 288, 290, and 292 that progressively increase the curvature of the workpiece so as to form the strip stock into a substantially round collar form. The formed collar 294, shown in FIG. 43B, is further roll-formed to create a mating flange portion 56, which is disposed transversely outwardly from the workpiece 294, which functions as the insertion flange portion 54 of the flanged ring connector. The mating flange portion 56 is formed by rollers 298 and 300, which hold the workpiece 294 in place while a third roller 302 rotates and moves in the direction of arrow 304 to form the mating flange portion 296. Thereafter, a seat 58 is formed by rollers 238 and 240 in the manner discussed above with respect to FIG. 41B. The resulting flanged ring connector 50 is illustrated in FIG. 43D.

Figure 44A:
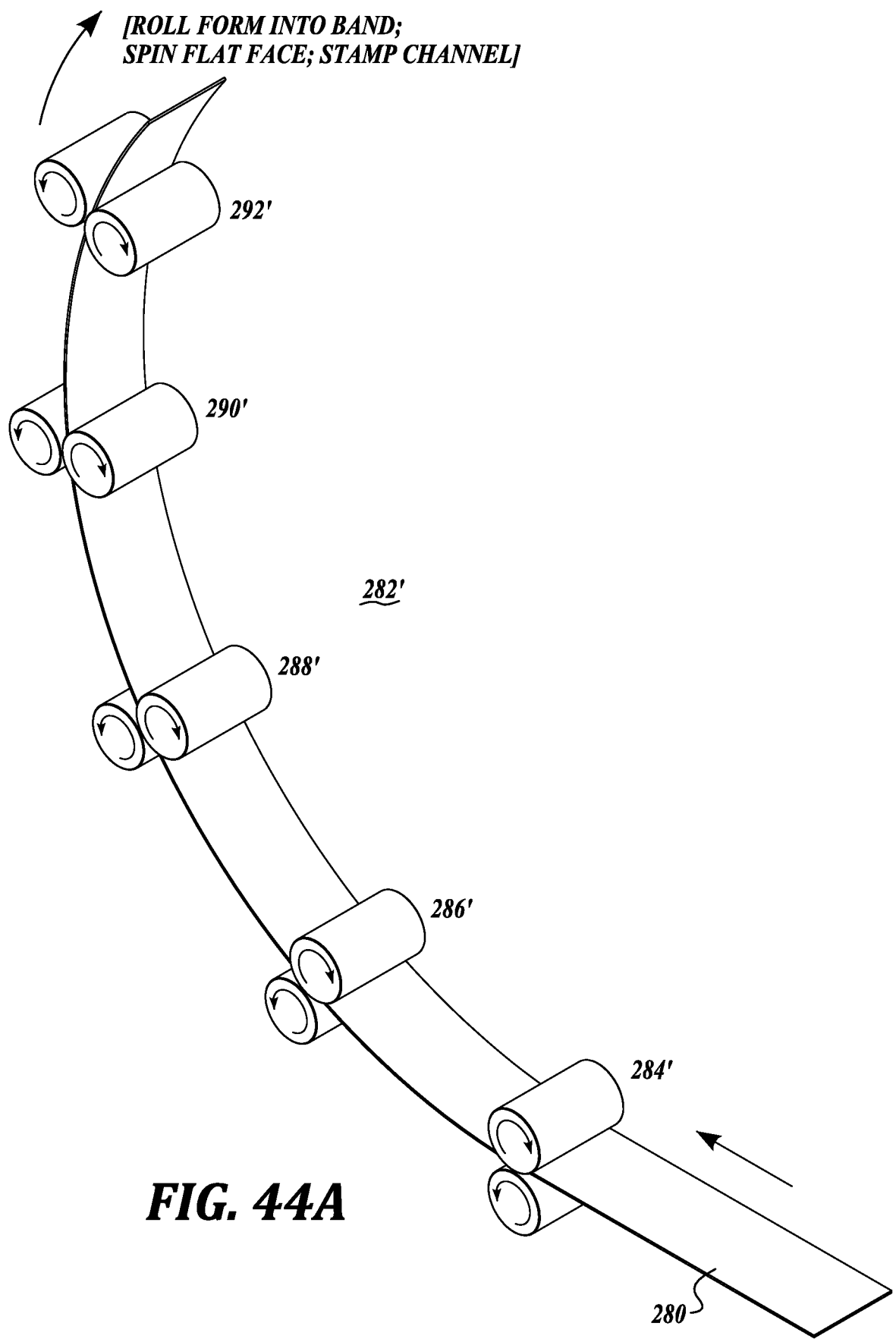
FIGS. 44A-44D illustrate a further method of manufacturing the flanged ring connectors of the present disclosure.
Figure 44B:
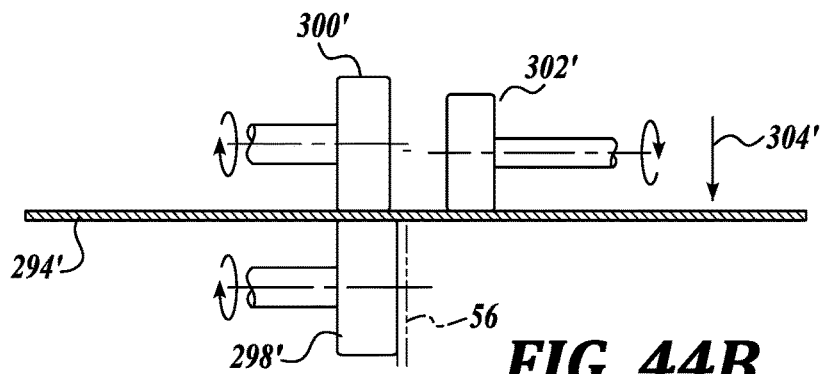

Another method of forming a flanged ring connector 50 is illustrated in FIGS. 44A-44D. Referring to FIG. 44A, strip stock 280' is formed into a circular collar utilizing a roll form apparatus 282' that may be similar or the same as roll-forming unit 282 shown in FIG. 43A. The circular collar produced by roll-forming unit 282' is then further processed by a second roll-forming unit shown in FIG. 44B that may be the same or similar to the roll-former shown in FIG. 43B. Accordingly, the part numbers for the roll-forming units shown in FIGS. 44A and 44B are identified with the same part numbers as in FIGS. 43A and 43B but with the addition of the prime (') designation.

Figure 44C:
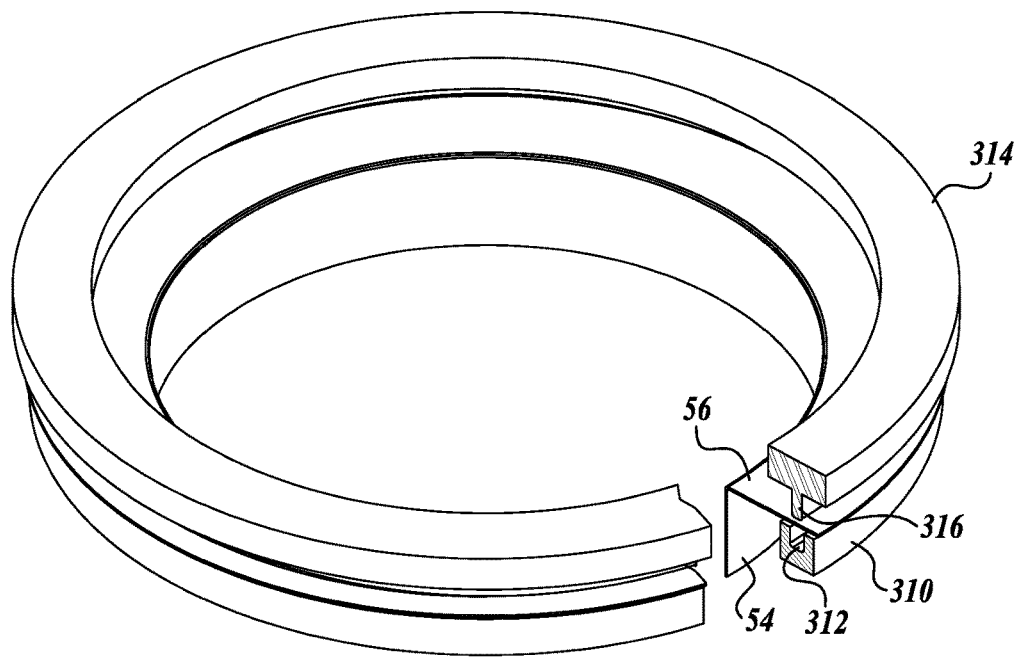
Figure 44D:
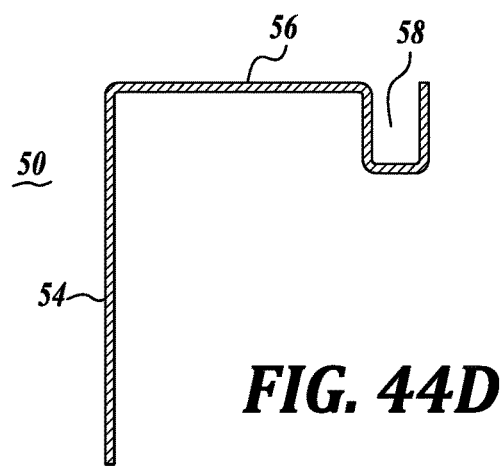

When the roll-forming operation in FIG. 44B is completed, the workpiece includes an insertion flange 54 and a flat mating flange 56, as shown in FIG. 44C. The seat 58 is formed in the mating flange 56 by a stamping process composed of a circular lower female die 310 having the U-shaped groove 312 formed therein, corresponding to the exterior shape of seat 58 to be formed in the mating flange portion 56. An upper male die 314 includes a male insertion portion 316, which is pressed downwardly into the groove 312, thereby to deform the mating face portion 56 to form seat 58, as shown in FIG. 44D.

Figure 45A:
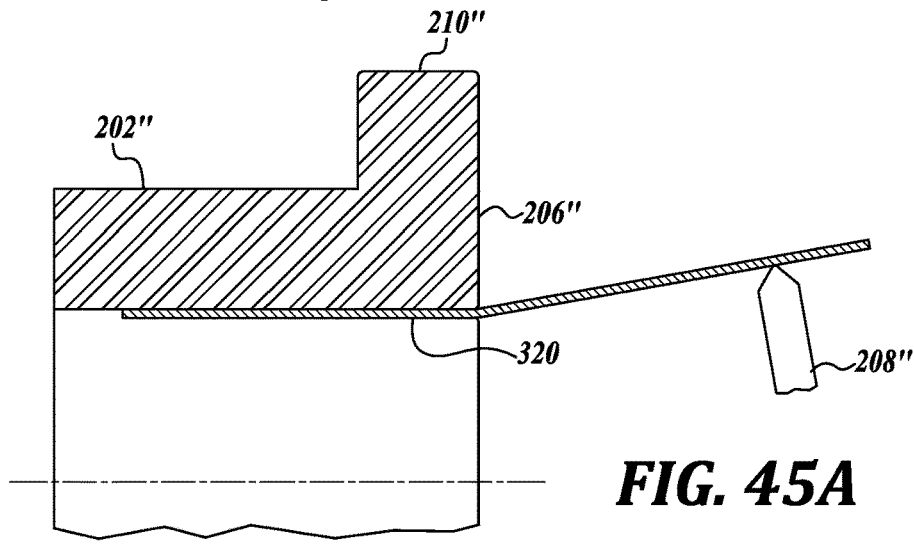
FIGS. 45A-45C illustrate a further method of manufacturing the flanged ring connectors of the present disclosure.
Figure 45B:
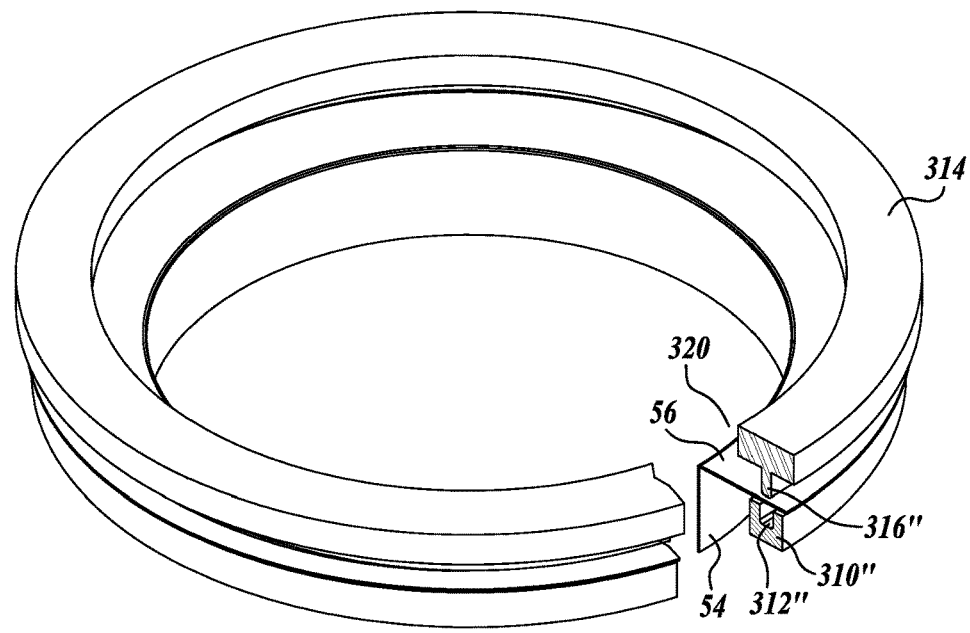
Figure 45C:
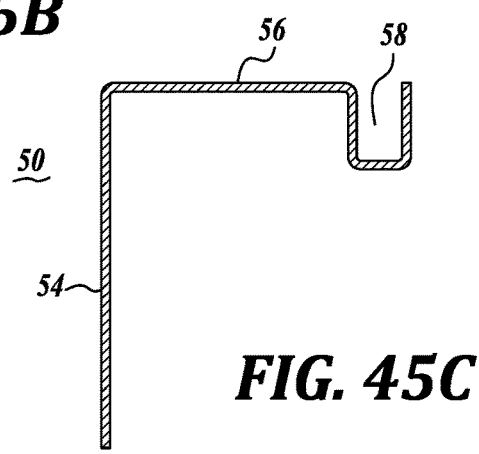

Another method of forming flanged ring connector 50 is shown in FIGS. 45A-45C. Referring to FIG. 45A, the process begins with a collar-shaped workpiece 320, which can be formed by spin-forming, roll-forming, or stamping, etc., as described above. The collar-shaped workpiece is then placed within a spin die 202', shown in FIG. 45A, so as to form a mating flange portion 56 of the flanged ring connector 50. This procedure may be the same as shown in FIG. 40A above. Accordingly, the part numbers utilized in FIG. 45A for the spin die are the same as in FIG. 40A but with the addition of a double prime (") designation.

Thereafter, the workpiece 320 is placed within a press die set, shown in FIG. 45B, which may be similar or the same as that shown in FIG. 44C. Accordingly, the components of the die set shown in FIG. 45B are numbered the same as in FIG. 44C but with a double prime (") designation. The resulting flanged connector 50 is shown in FIG. 45C.

A further method of forming flanged ring connector 50 is illustrated in FIGS. 46A-46D, wherein a workpiece in the form of a longitudinal strip stock 330 is processed with a roll-forming set composed of a first roller 332 having a groove 334 formed therein, corresponding to the exterior shape of seat 58. A male roller 336 engages with the groove 334 to form the seat 58. Sequentially or simultaneously, a second roller 338 may be utilized to bend the workpiece 330 about edge 340 of the roller 332, thereby to form the insertion flange portion 54 of the connector 50. Thereafter, the formed longitudinal workpiece is rolled into a circular configuration utilizing roller set 262", shown in FIG. 46D. The roller set 262" may be the same or similar to roller set 262, shown in FIG. 42D. As such, the components of the roller set 262" are identified with the same part numbers as used in FIG. 42D but with a triple prime ('") designation.

Figure 46A:
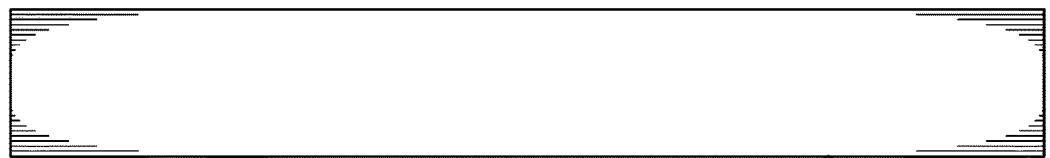
FIGS. 46A-46D illustrate a further method of manufacturing the flanged ring connectors of the present disclosure.
Figure 46B:
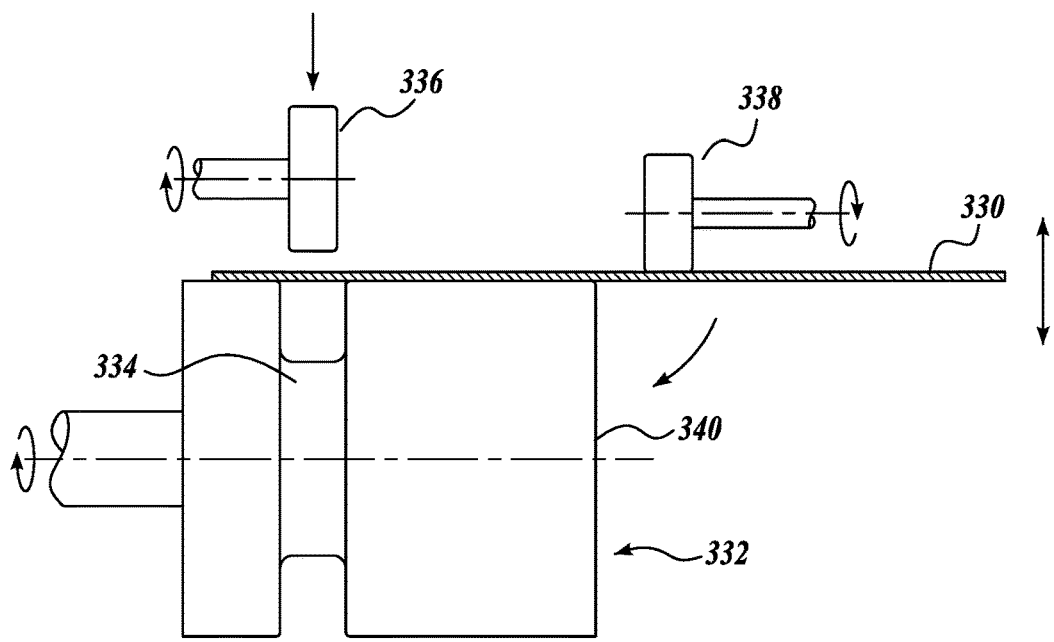
Figure 46C:
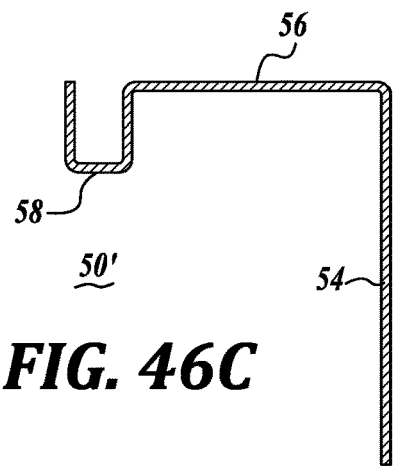
Figure 46D:
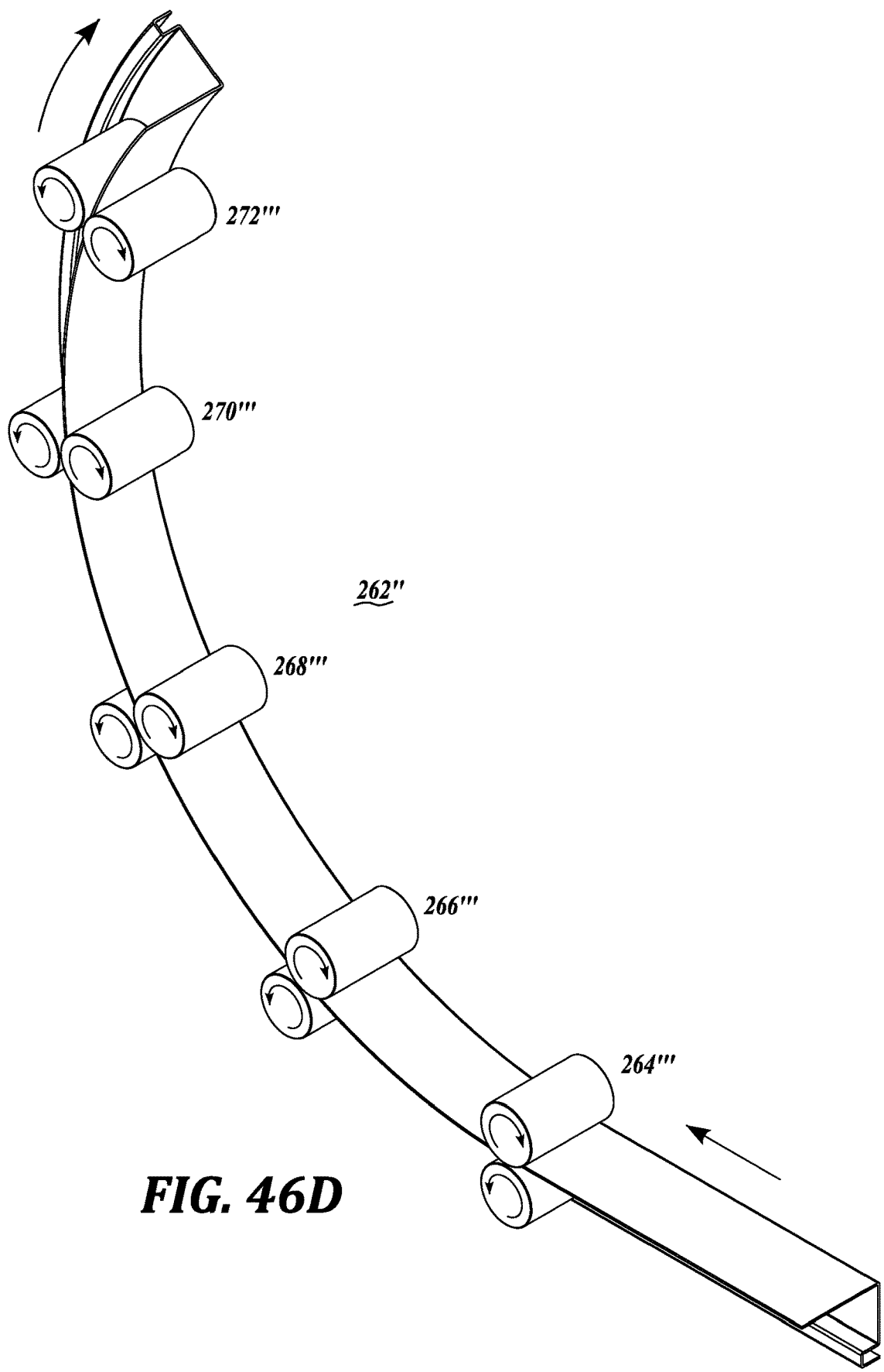
Figure 47A:
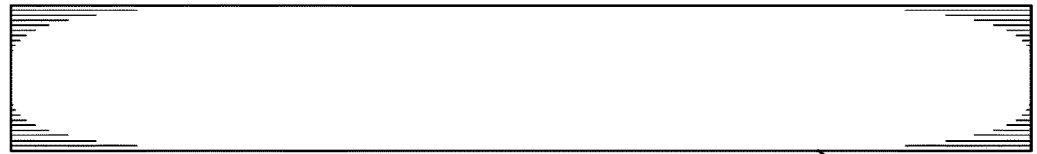
FIGS. 47A-47E illustrate a further method of manufacturing the flanged ring connectors of the present disclosure.
Figure 47B:
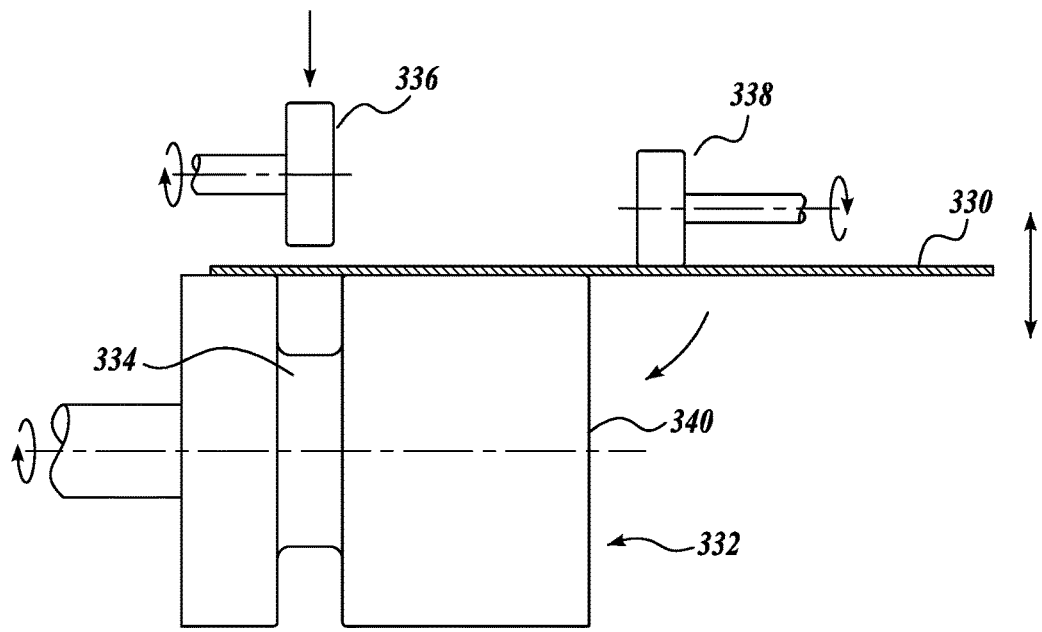
Figure 47C:
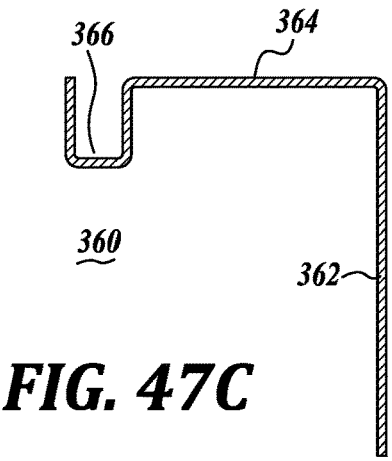

FIGS. 47A-47E illustrate a further method of forming flanged ring connector 360 having a cross-sectional shape similar to flanged ring connector 350, but for use with square ducting. As in the method shown in FIGS. 46A-46D, workpiece 360 is formed into the cross-sectional shape shown in FIG. 46C utilizing the roller set system shown in FIG. 47B, which may be the same as shown in FIG. 46B. Accordingly, the same part numbers for the same components are utilized. As shown in FIG. 47C, the formed workpiece includes an insertion flange portion 362, a mating flange portion 364, and a seat portion 366.

Figure 47D:
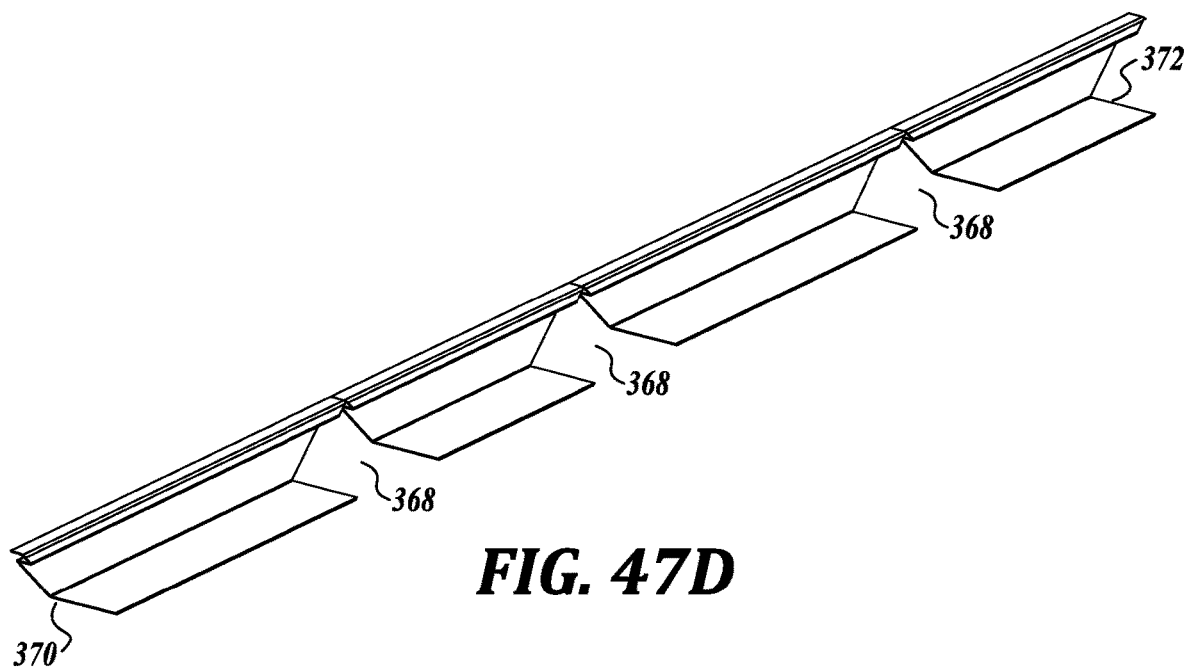
Figure 47E:
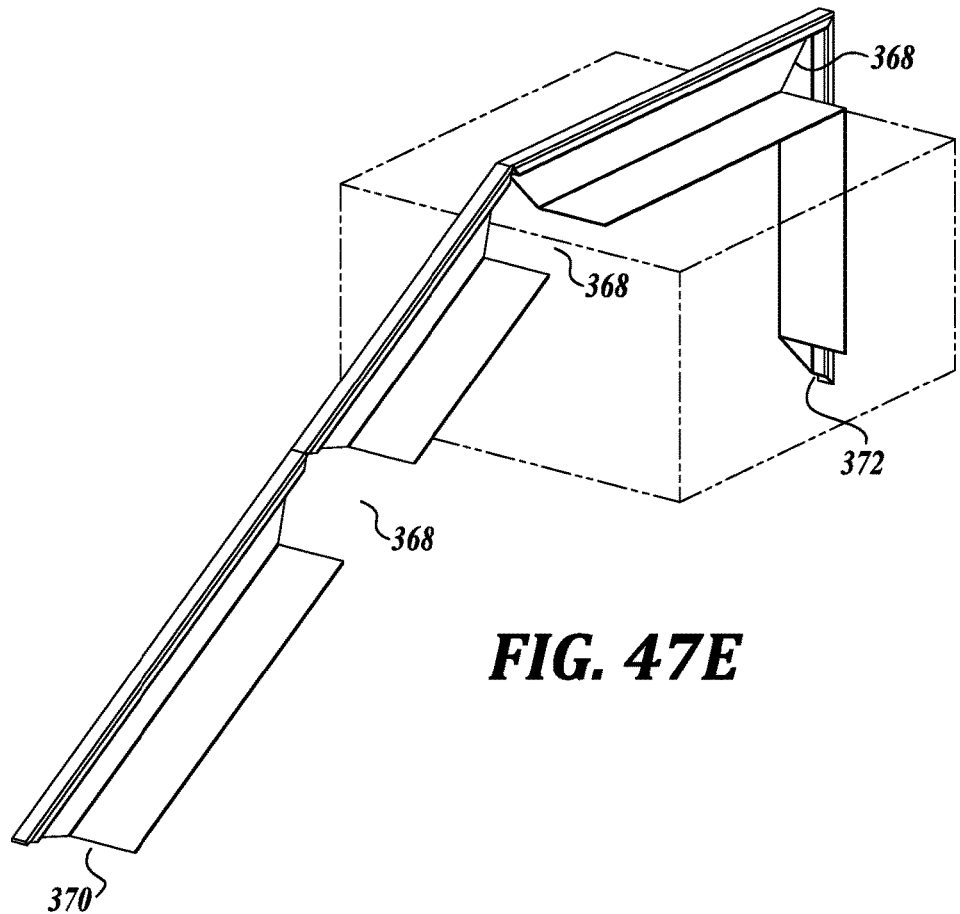

As can be appreciated, the workpiece shown in FIG. 47C is still in the form of a longitudinal straight workpiece. As shown in FIG. 47D, notches 368 are cut in the workpiece either after forming the workpiece, as shown in FIG. 47C, or before the workpiece is formed, as discussed in U.S. Pat. No. 7,163,030, incorporated herein by reference. End notches 370 and 372 are also formed in the ends of the workpiece. The notches correspond to the corners of the rectangular flanged connection ring, as shown in FIG. 47E. When the workpiece is bent at the notches 368, the edges of the notched mating flange 384 and notched insertion flange close or join together to form closed corners. The corners can be welded or otherwise held to retain their shape.

Figure 48A:
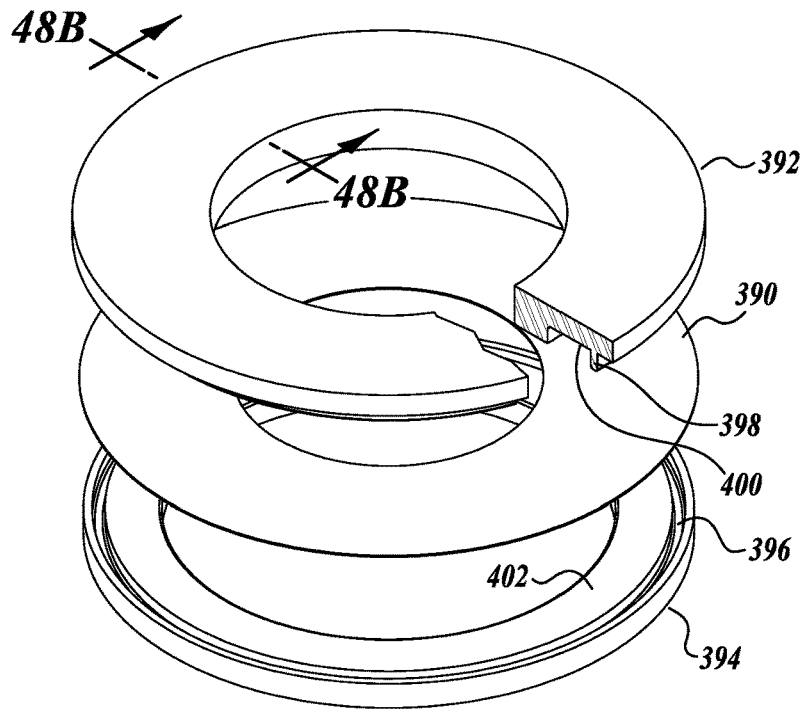
FIGS. 48A-48C illustrate a further method of manufacturing the flanged ring connectors of the present disclosure.
Figure 48B:
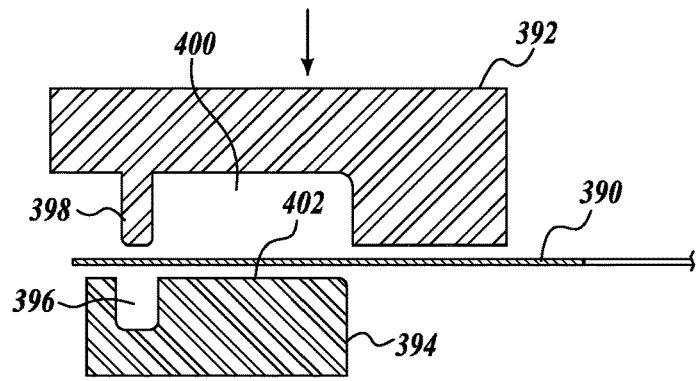
Figure 48C:
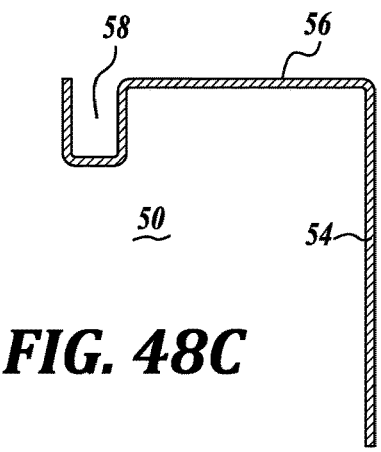

A further method of forming flanged connector 50 is illustrated in FIGS. 48A-48C, wherein an annular disk-shaped workpiece 390 is placed between a circular upper die 392 and circular lower die 394. The lower die 394 is formed with a groove 396 corresponding to the exterior shape of seat 58. The upper circular die 392 includes a male plunger section 398 that is shaped and sized to engage within groove 396. The upper die also includes an upper cavity 400 that is shaped and sized to correspond to die portion 402 of the lower die 394. As shown in FIG. 48B, when the upper die is engaged downwardly into the lower die 394, a circular flanged ring connector 50 is produced, as shown in FIG. 48C. It is to be appreciated that, rather than producing a singular flanged ring connector 50, the die set shown in FIGS. 48A and 48B may be designed to produce several flanged ring connectors at the same time in a single punching operation wherein the formed flanged ring connectors are nested within each other.

Figure 49A:
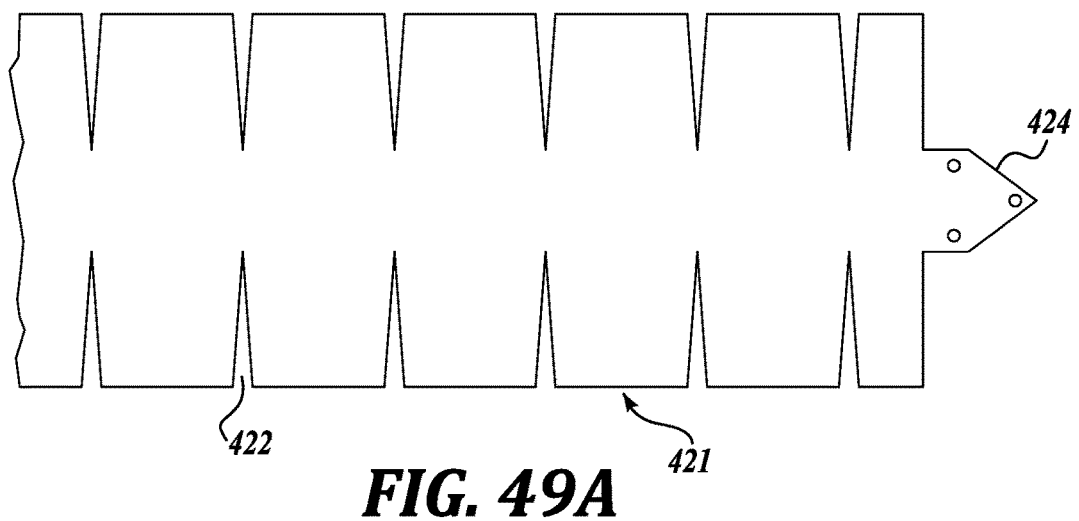
FIGS. 49A and 49B illustrate a clamp that can be utilized to interconnect face-to-face flanged ring connectors of the present disclosure.
Figure 49B:
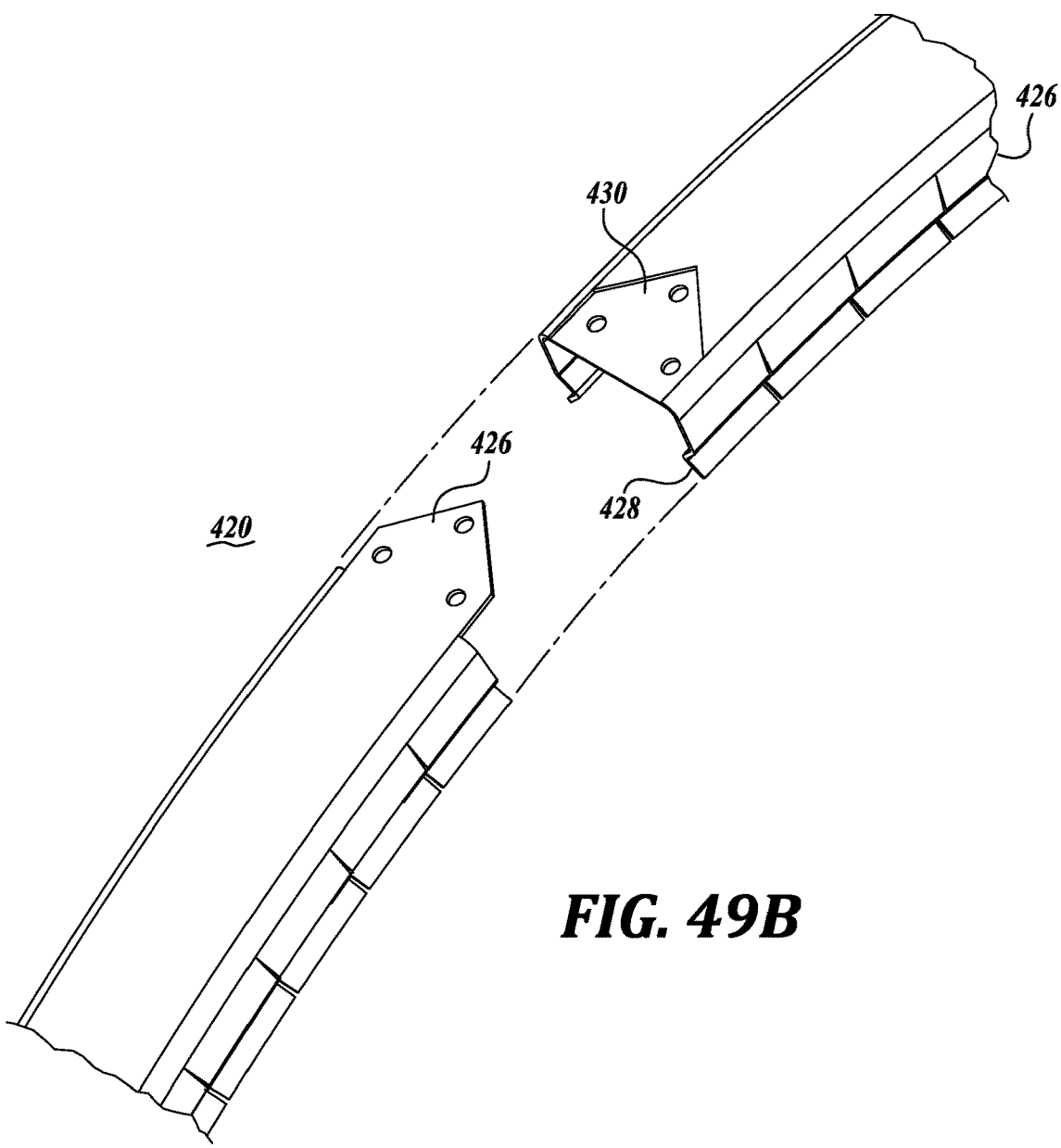

FIGS. 49A and 49B illustrate the construction of a clamp 420 that can be used to engage over the outer perimeters of the flanged ring connectors, and in particular over the seat portions of the flanged ring connectors when in face-to-face relationship, whether the seat portions are used to house seals, reinforcing members, or both. One possible configuration of the clamp "in the flat" is shown in FIG. 49A, wherein transverse triangular sections 422 are cut or stamped along the length of the flat workpiece 421. A connector tab 424 projects from one end of the workpiece 421.

The flat workpiece 421 may be formed to the circular shape shown in FIG. 49B by roll-forming, stamping, spin-forming, etc. Once the clamp 426 is shaped into the form shown in FIG. 49B, the edges formed by the cutting of the triangular sections 422 from the workpiece close up against each other to form a continuous sidewall structure 426. A flare or tab 428 can be formed in the sidewall 426, to serve as a "lead-in" to facilitate engagement of the clamp 420 over the two flanged ring connectors to be held in place.

As shown in FIG. 49B, the tab 425 corresponds to a similarly shaped seat 430 formed in the opposite end of the clamp 422. Standard fasteners may be utilized to connect the tab 425 to the seat 430. It will be appreciated that a seat per se need not be formed in the clamp 420, but holes may simply be formed in the clamp 420 corresponding to the hole pattern of the tab 424.

Figure 50:
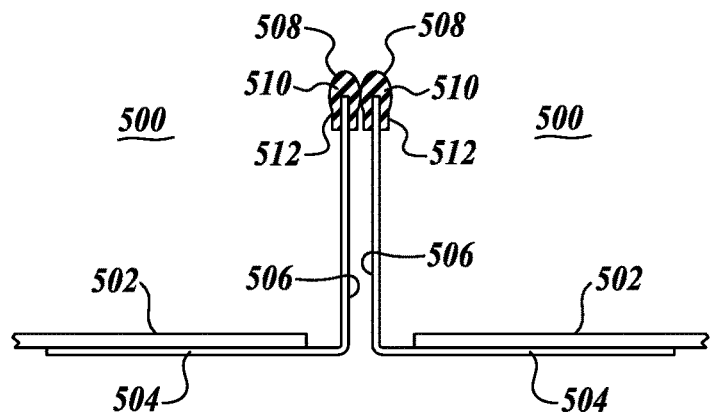
FIGS. 50, 51, and 52 illustrate, in partial cross-section, various configurations of flanged ring connectors corresponding to the present disclosure, shown in face-to-face relationship to each other, with seal members of various exemplary shapes.
Figure 51:
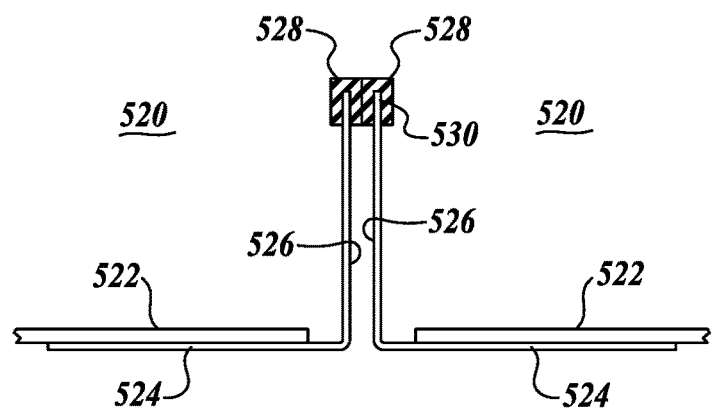
Figure 52:
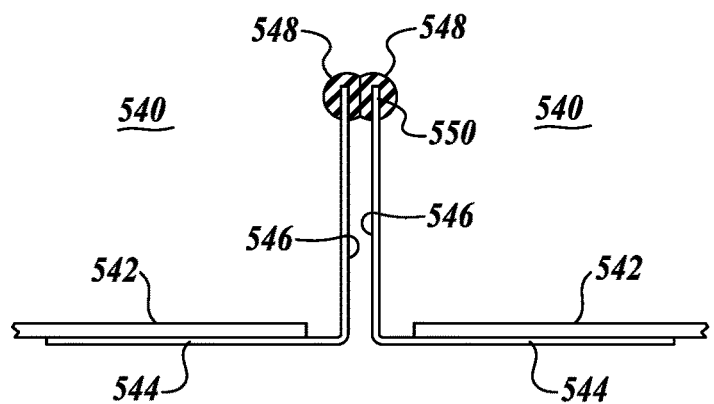

FIGS. 50-52 pertain to various embodiments of flanged ring connectors 500, 520, and 540 for connecting the adjacent ends of HVAC ducting 502, 522, and 542, respectively. The flanged ring connectors 500, 520, and 540 are similar in that they include insertion flanges 504, 524, and 544, respectively, to engage within the interior of the ducting 502, 522, and 542, respectively, and are of a shape corresponding to the cross-sectional shape of the ducting. The flange ring connectors 500, 520, and 540 also include mating flanges 506, 526, and 546 extending laterally or transversely to the insertion flanges 504, 524, and 544, respectively. The insertion flanges have mating faces that are disposed in face-to-face relationship with the mating face of a corresponding flanged ring connector. The mating flanges have second faces on the opposite side of the mating flange, which faces the direction that the insertion flange projects from the mating flange. Seals 508, 528, and 548 extend around and are disposed on the outward circumferences of the mating flanges 506, 526, and 546.

In FIG. 50, the seal 508 includes a circular or semicircular shaped body portion 510 with spaced-apart flaps or flanges 512 extending from the body portion 510 to overlap the surfaces of the mating flanges 506. The flanges 512 may be adhered or otherwise attached to the mating flange portions 506 to securely hold the seals 508 in place. The seals 508 of the face-to-face mating flanges 506 compress against each other and provide a secure seal between the interior of the duct 502 and the ambient.

As discussed above with respect to the flange ring connectors shown in FIGS. 1-19, the flange ring connectors 500, 520, and 540 can be attached together by various techniques, including by screws, bolts, or other types of hardware extending through and between adjacent mating flanges 506, 526, and 546. Also, rather than being of a circular or semicircular shape, the body portions 510 of the seal 508 can be of other cross-sectional shapes, such as oval, rectangular, square, etc. Moreover, the seal 508 can be composed of various material compositions. For example, the seal may be composed of a natural or synthetic rubber material that may be of solid construction or foam construction, or of hollow or semi-hollow construction. The seal will need to be at least somewhat compressible so that the mating flanges 506, 526, and 546 can be connected together in secure face-to-face relationship with each other, with the compressed seal forming an airtight juncture between the mating flanges 506, 526, and 546.

In FIG. 51, the seal 528 is generally rectangular in cross-section, with a slot 530 formed therein to closely receive the outer edge portion of mating flanges 526. Such mating flanges can be attached to the seal 528 with an adhesive or by other means. The material composition of the seal 528 can be similar to that described above with respect to seal 508. Other than the shape of the seal 528, the flange connector 520 shown in FIG. 51 can be essentially the same as the flange connector 500 shown in FIG. 50.

FIG. 52 illustrates a flange connector 540 that is similar in construction to flanged connector 520. The flanged connector 540 includes a semicircular or circular seal 548 that has a slot 550 formed therein for receiving the mating flange 546 of the flange connector. As in seal 528, seal 548 may be attached to the outer rim portion of the mating flange 546 by a suitable adhesive or other expedient. Also, the material construction of the seal 548 may be similar to that of seals 528 and 508.

It will be understood that the shapes of the seals 508, 528, and 548 are merely exemplary, and as such, other cross-sectional shapes for the seals may be utilized.

Figure 53:
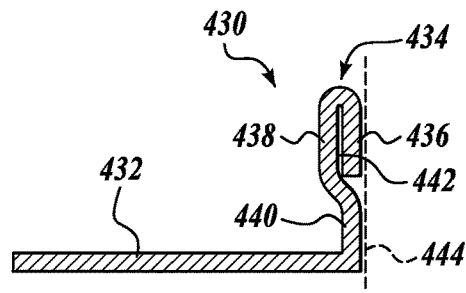
FIG. 53 is a cross-sectional view of an offset flange connector in accordance with embodiments provided herein.

An offset flanged connector is also provided herein. Referring to FIG. 53, an offset flanged connector 430 is illustrated in cross section. The offset flanged connector 430 includes a longitudinal portion 432 and a laterally extending (annular) flange portion 434 comprising a radially distal flange face section 438 and a return 436. A radially proximal flange face section 440 extends laterally from the longitudinal portion 432. The flange portion 434 is offset longitudinally such that the return 436 and the radially proximal flange face section 440 are substantially co-planar to cooperatively define an offset flange face 444. By providing the offset flange face 444 on the end of the offset flanged connector 430, two offset flanged connectors 430 can be abutted such that their respective offset flange faces 444 will be flush.

Figure 54:
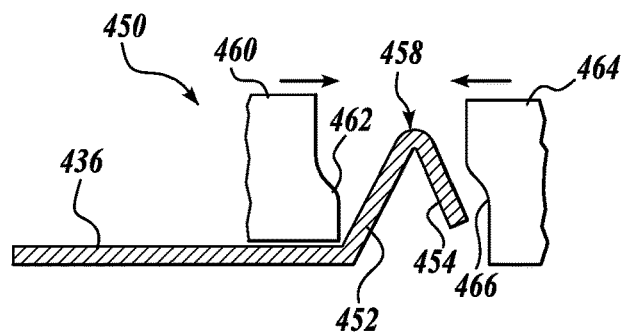
FIG. 54 represents a method for forming the offset flange connector illustrated in FIG. 53.

A representative method of forming the offset flanged connector 430 (illustrated in FIG. 53) is provided in FIG. 54. Referring to FIG. 54, a deformed band 450 is created. The band 450 includes a longitudinal portion 456 and a laterally extending deformed section 458 comprising, a flange face 452 and a return 454. The distance between the flange face 452 and the return 454 is closed, and an offset is provided, by compressing (i.e., pinching) the deformed section 458 between two forming tools 460 and 464. The first tool 460 comprises a protrusion 462 upon which the flange face 452 is forced. The second tool 464 comprises a cutout or relief 466 of a shape substantially inverse to that of the protrusion 462, such that when the tools 460 and 464 are compressed, with the deformed section 458 located therebetween, an offset flanged connector 434, having the profile illustrated in FIG. 53, is formed.

Figure 55:
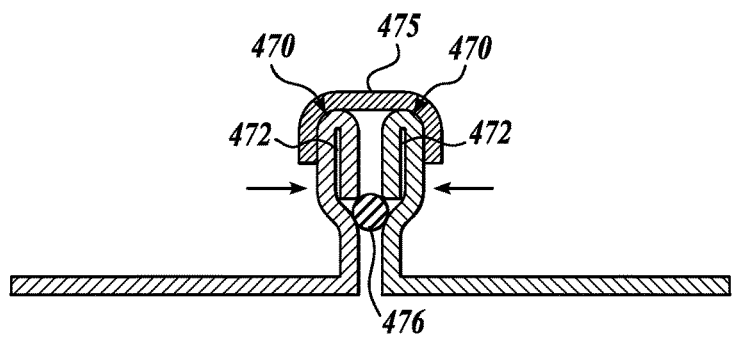
FIG. 55 illustrates the joining of two offset flange connectors (as illustrated in FIG. 53) having a gasket seal intermediate.

Referring to FIG. 55, the formation of a seal between two offset flanged connectors 470 is illustrated. A gasket 476 is provided intermediate the offset flanged connectors 470 such that communication between the interior of the ducting/piping and the pockets 472 within the flanges 470 is not permitted. Such a configuration is desirable for environments where moisture and contaminate control is of utmost concern (e.g., computer chip manufacturing facility HVAC systems). For a seal such as that illustrated in FIG. 55, clamping or other binding or connection methods known to those of skill in the art can be used to secure the flanges 470 and gasket 476 in the desired position. Although the gasket 476 is illustrated is being of nominally round cross-sectional shape, other gasket shapes and configurations can be used. Also, the gasket can be composed of numerous suitable materials. A closure band 475, as are known to those of skill in the art, is illustrated in FIG. 55, and providing the force to form the seal. It will be appreciated that any method for applying pressure to the flanges 470 to form the seal are contemplated.

Figure 56:
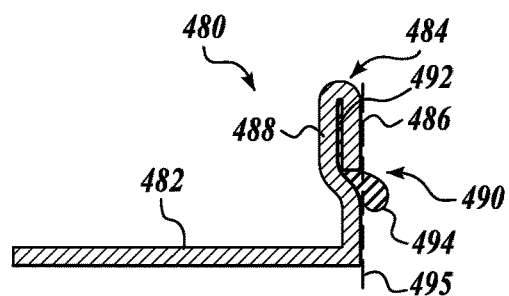
FIG. 56 is a cross-sectional view of an offset flange connector having an embedded gasket therein.

Referring to FIG. 56, an offset flanged connector 480 is illustrated as having an embedded or captured gasket 490. Referring still to FIG. 56, the offset flanged connector 480 comprises a longitudinal portion 482 and a laterally extending flange 484 comprising a flange face section 488 and a return 486. The offset design allows for a gasket 490 to be immobilized within the flange 484. Specifically, the gasket 490 comprises a minor portion 492, embedded within the flange 484, and a major portion 494 disposed adjacent the flange face section 488 and return 486 to project beyond the plane of an offset flange face 495. Such an offset flanged connector 480 is useful to save time and effort when assembling a ducting system, similar to that illustrated in FIG. 55, because positioning of the gasket 490 is provided automatically by the offset flanged connector 480.

Figure 57:
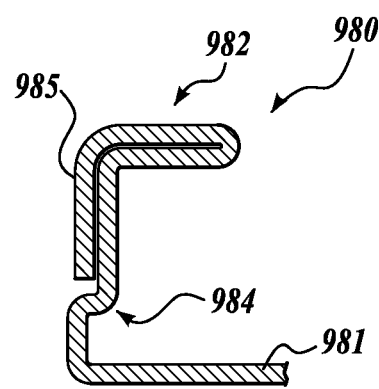
FIGS. 57 and 58 illustrate cross-sectional profiles representative of flanges in accordance with embodiments provided herein.

Referring to FIG. 57, an offset flanged connector 980 is provided having an offset section 984 offsetting a flange portion 982 longitudinally. The return 985 forms the plane of the flange face. The connector 980 can be formed, for example, in the same manner as described with reference to FIGS. 53 and 54. Two offset flanged connectors 980 can be coupled together to form a seam, such as in FIG. 55.

Figure 58:
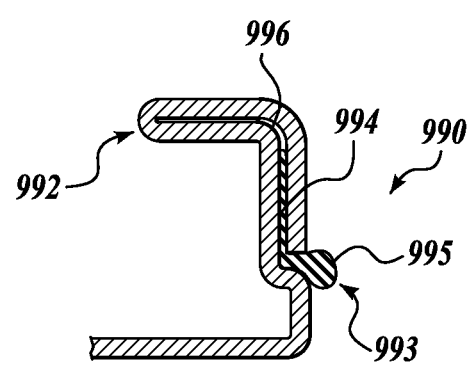

Referring to FIG. 58, an offset flanged connector 990 is provided, similar to that illustrated in FIG. 57, although also including a gasket 993 having a minor portion 994, embedded in a cavity 996 of an offset flange 992, and a major portion 995, positioned adjacent the flange face. An embedded gasket 993 provides the benefit of removing the difficulty of positioning a gasket between two flanges during assembly of a seam, as described above with reference to FIG. 56. The connector 990 can be formed, for example, in the same manner as described with reference to FIGS. 53-56 and 57.

While illustrative embodiments have been illustrated and described, it will be appreciated that various changes can be made therein without departing from the spirit and scope of the invention.

The invention claimed is:

1. A flanged ring connector to join adjacent ducts in an HVAC system, the flanged ring connector comprising:
   a. a mating flange defining a planar mating face, said mating flange also defining an outer perimeter portion and an inner perimeter portion;
   b. an insertion flange extending laterally from the inner perimeter portion of the mating flange, the insertion flange having a length sufficient to allow fixed attachment to the interior of an HVAC duct;
   c. a formed, enclosed seat extending around the outer perimeter portion of the mating flange, a portion of the seat being coplanar with the mating flange to serve as the radially outermost part of the mating flange, the seat extending from the mating flange in the direction that the insertion flange extends from the mating flange to define a cavity for receiving a reinforcing member; and
   d. the reinforcing member disposed and securely held within the cavity of the formed seat to position the reinforcing member against the mating flange, wherein the seat closely surrounds the reinforcing member.

2. The flanged ring connector according to claim 1, wherein the seat is of a cross-sectional shape, selected from the group consisting of square, polygonal, oblong, rectangular, circular, partially circular, quarter-circular, semi-circular, elliptical, oval, triangular, frusto triangular, and V-shaped; and
   the cross-sectional shape of the reinforcing member corresponds to the cross-sectional shape of the seat.

3. The flanged ring connector according to claim 1, wherein the mating flange, insertion flange, and seat collectively form a singular structure comprising the flanged ring connector.

4. The flanged ring connector according to claim 1, wherein the duct(s) of the HVAC system are selected from a cross-sectional shape including round, oval, square, rectangular, triangular, or rectilinear.

5. The flanged ring connector according to claim 1, wherein the seat is formed from the outer perimeter portion of the mating flange.

6. The flanged ring connector according to claim 1, wherein the seat completely surrounds the reinforcing member.

7. The flanged ring connector according to claim 1, wherein the seat is formed by one of more of roll forming, spin forming, bending, pressing, and stamping.

8. A flanged ring connector to join adjacent ends of HVAC ducts, the flanged ring connector comprising:
   a. a mating flange connectable to the end of an HVAC duct, the mating flange defining a planar mating face for face-to-face attachment to the mating flange of an adjacent HVAC duct, the mating flange defining an inner perimeter portion and an outer perimeter portion disposed outwardly from the inner perimeter portion;
   b. a formed seat extending around the outer perimeter portion of the mating flange, a portion of the seat being coplanar with the mating flange to serve as the radially outermost part of the mating flange, the seat extending from the mating flange in the direction away from the mating flange of the adjacent HVAC duct to define an interior cavity for receiving a reinforcing member; and
   c. the reinforcing member disposed and securely captured within the interior cavity of the seat, the reinforcing member thereby bearing against the mating flange.

9. The flanged ring connector according to claim 8, wherein the seat is of a cross-sectional shape, selected from the group consisting of square, polygonal, oblong, rectangular, circular, partially circular, quarter-circular, semi-circular, elliptical, oval, triangular, frusto triangular, and V-shaped; and
   the cross-sectional shape of the reinforcing member corresponds to the cross-sectional shape of the seat.

10. The flanged ring connector according to claim 8, wherein the mating flange further comprising an insertion flange extending laterally from the inner perimeter portion of the mating flange to overlap the end portion of the HVAC duct; and
   wherein the mating flange, insertion flange, and seat collectively form a singular structure comprising the flanged ring connector.

11. The flanged ring connector according to claim 8, wherein the duct(s) of the HVAC system are selected from a cross-sectional shape including round, oval, square, rectangular, triangular, or rectilinear.

12. The flanged ring connector according to claim 8, wherein the seat is formed from the outer perimeter portion of the mating flange.

13. The flanged ring connector according to claim 8, wherein the seat completely surrounds the reinforcing member.

14. The flanged ring connector according to claim 8, wherein the seat is formed by one of more of roll forming, spin forming, bending, pressing, and stamping.

* * * * *